(12) United States Patent
Kumazawa et al.

(10) Patent No.: US 11,428,251 B2
(45) Date of Patent: Aug. 30, 2022

(54) WELD STRUCTURE OF METAL MEMBER AND WELDING PROCESS

(71) Applicant: Panasonic Intellectual Property Management Co., Ltd., Osaka (JP)

(72) Inventors: Seiji Kumazawa, Osaka (JP); Tomomi Tanaka, Hyogo (JP); Daisuke Shioga, Nara (JP); Takayuki Ashida, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 703 days.

(21) Appl. No.: 15/754,294

(22) PCT Filed: Sep. 8, 2016

(86) PCT No.: PCT/JP2016/004093
§ 371 (c)(1),
(2) Date: Feb. 22, 2018

(87) PCT Pub. No.: WO2017/047050
PCT Pub. Date: Mar. 23, 2017

(65) Prior Publication Data
US 2018/0245616 A1    Aug. 30, 2018

(30) Foreign Application Priority Data
Sep. 15, 2015  (JP) .............................. JP2015-181451

(51) Int. Cl.
*F16B 5/08*     (2006.01)
*B23K 26/244*   (2014.01)
*B23K 26/323*   (2014.01)

(52) U.S. Cl.
CPC .............. *F16B 5/08* (2013.01); *B23K 26/244* (2015.10); *B23K 26/323* (2015.10)

(58) Field of Classification Search
CPC ... F16B 5/08; F16B 9/01; B23K 26/08; B23K 26/244; B23K 26/323; B23K 26/322;
(Continued)

(56) References Cited

U.S. PATENT DOCUMENTS 2,963,129 A * 12/1960 Eberle ................... B23K 9/232
                                                    428/614
4,873,416 A * 10/1989 Boder .................... F42B 14/02
                                                    219/121.64
(Continued)

FOREIGN PATENT DOCUMENTS

CN    100528453 C      8/2009
DE    102010039893 A1  3/2012
(Continued)

OTHER PUBLICATIONS

English Translation of Chinese Search Report dated Apr. 3, 2019 for the related Chinese Patent Application No. 201680051531.0.
(Continued)

*Primary Examiner* — Josh Skroupa
(74) *Attorney, Agent, or Firm* — Panasonic IP Management; Kerry S. Culpepper

(57) ABSTRACT

Weld structures of metal members include: a first member; and a second member that is layered together with the first member, wherein at least one first solidified part that extends from a surface of the first member to the inside of the first member, at least one second solidified part that is formed by a molten area extending through the first member and the second member, and at least one third solidified member that is formed by a molten area extending through the first member and the second member are provided, and the third solidified part is located closer to a non-layered surface of the second member than the second member is.

12 Claims, 16 Drawing Sheets

(58) Field of Classification Search
CPC .... B23K 26/21; B23K 26/20; B23K 2103/10; B23K 2103/12; B23K 2103/20; B23K 2103/22; B23K 2103/24; B32B 15/017; Y10T 403/20; Y10T 403/477; Y10T 403/478; Y10T 403/479
USPC .................. 403/272; 288/178, 262.5, 262.6; 228/178, 262.5, 262.6
See application file for complete search history.

(56) References Cited

U.S. PATENT DOCUMENTS

| | | | | |
|---|---|---|---|---|
| 5,343,014 | A * | 8/1994 | Ogino | B23K 26/32 |
| | | | | 219/121.64 |
| 6,163,011 | A * | 12/2000 | Urushizaki | F02M 51/0671 |
| | | | | 219/121.64 |
| 7,154,065 | B2 * | 12/2006 | Martukanitz | B23K 9/173 |
| | | | | 219/121.64 |
| 9,308,602 | B2 * | 4/2016 | Hayashimoto | B23K 26/28 |
| 11,185,947 | B2 * | 11/2021 | Kumazawa | B23K 26/323 |
| 2005/0230364 | A1 * | 10/2005 | Wang | B23K 26/244 |
| | | | | 219/121.64 |
| 2009/0223940 | A1 * | 9/2009 | Hosoya | H01R 43/0221 |
| | | | | 219/121.64 |
| 2011/0159353 | A1 * | 6/2011 | Byun | H01M 2/202 |
| | | | | 429/160 |
| 2012/0189904 | A1 * | 7/2012 | Kawada | H01M 2/365 |
| | | | | 429/163 |
| 2014/0377625 | A1 * | 12/2014 | Tsutsumi | H01M 2/204 |
| | | | | 429/121 |

FOREIGN PATENT DOCUMENTS

| | | | | |
|---|---|---|---|---|
| DE | 102013015710 A1 * | 7/2014 | .......... | B23K 26/244 |
| JP | 11-239888 | 9/1999 | | |
| JP | 2004-255435 | 9/2004 | | |
| JP | 2004255435 A * | 9/2004 | .......... | B23K 26/244 |
| JP | 2008-213004 A | 9/2008 | | |
| JP | 2010-094701 | 4/2010 | | |
| JP | 2012-115876 | 6/2012 | | |
| JP | 2014147962 A * | 8/2014 | .......... | B23K 26/244 |
| WO | 2006/016441 | 2/2006 | | |
| WO | 2015/114445 A2 | 8/2015 | | |

OTHER PUBLICATIONS

The Extended European Search Report dated Sep. 13, 2018 for the related European Patent Application No. 16845925.3.
International Search Report of PCT application No. PCT/JP2016/004093 dated Oct. 25, 2016.
Communication pursuant to Article 94(3) EPC dated Aug. 4, 2021 for the related European Patent Application No. 16845925.3.

* cited by examiner

WELD STRUCTURE OF METAL MEMBER AND WELDING PROCESS

CROSS-REFERENCE TO RELATED APPLICATIONS

This application is a U.S. national stage application of the PCT International Application No. PCT/JP2016/004093 filed on Sep. 8, 2016, which claims the benefit of foreign priority of Japanese patent application No. 2015-181451 filed on Sep. 15, 2015, the contents all of which are incorporated herein by reference.

TECHNICAL FIELD

The technical field relates to a weld structure that is formed by layering different metal plates, followed by welding these materials, and a welding process for producing the same. In particular, the technical field relates to a weld structure between electrodes of batteries and a metal connecting the electrodes, and a welding process for producing the same.

BACKGROUND

In battery systems, multiple battery cells can be connected in parallel to increase output voltages.

Furthermore, in battery systems, multiple battery cells can be connected in parallel to increase charge/discharge currents.

For example, in high-current and high-power battery systems used for the purposes of power supplies for motors driving vehicles, multiple battery cells are connected in parallel so as to increase output voltages.

In battery systems used for such purposes, multiple battery cells are connected through bus bars that are formed of metal plates.

The bus bars are connected to terminals of electrodes in the battery cells constituting the battery systems, based on laser welding.

For forming such connection structures, cut parts are provided in the bus bars; the terminals of electrodes in battery cells are inserted into the cut parts; and boundaries between the inserted terminals of electrodes and the bus bars are irradiated with laser beams so as to fuse the terminal and the bus bars around their boundary areas, such that the terminals and the bus bars are connected to each other.

Negative and positive electrodes are provided in batteries. In general, aluminum terminals are employed at positive electrodes while nickel-plated copper terminals are employed at negative electrodes.

One bus bar is provided with at least two cut parts.

Terminals of the electrodes of adjacent battery cells are inserted into the two cut parts of the bus bar.

As a result, the battery cells can be connected in series or parallel based on the bus bars.

In cases in which aluminum/copper-combined materials that are called clad materials are used for bus bars, the aluminum terminals at positive electrodes are welded to the aluminum parts of the clad materials while the copper terminals at negative electrodes are welded to the copper parts of the clad materials.

In that case, since the same types of metals are welded, there would not be any particular technical difficulties.

However, in order to produce clad materials, thin plates of aluminum and copper are stacked in layers such that their joint parts are brought into contact with one another, and then, the joint parts are bonded through a heat-pressing process. Therefore, costs required for this process, and direct material costs would be higher.

Thus, there has been a problem in which it is impossible to reduce costs for joining the bus bars and the electrodes.

However, by employing aluminum for bus bars, which is inexpensive, it has become possible to produce inexpensive and light battery systems.

However, when such aluminum bus bars are employed, welding of the different materials (i.e., aluminum bus bars and nickel-plated copper terminals) is required at the negative-electrode sides, and thus, it would be difficult to reliably realize high-quality welding, although there would be no problem at the positive-electrode sides since the same types of materials (i.e., aluminum bus bars and aluminum terminals) are welded to one another.

In welding different types of materials, different metal materials are caused to fuse and mix together. Then, the materials are solidified so as to weld the different materials.

However, particularly with regard to a heterogeneous-material welding process using aluminum and copper, if alloys of these metals are sufficiently heated, and are continuously melted above a certain temperature for a certain period of time, intermetallic compounds having certain compositional ratios of aluminum and copper will be produced.

Such intermetallic compounds would form very hard layers with less lattice defects. However, the layers are fragile, and will be broken if any stress is applied thereto.

Therefore, high joint strength cannot always be obtained by way of merely increasing a volume of molten aluminum and copper. Thus, it is very difficult to reliably realize high-quality welding since there are various factors (e.g., gaps) causing variations in the production.

For welding of different materials, there has been a disclosure of a weld structure serving as a countermeasure for insufficient strength, in which high and low hardness layers are alternately stacked in layers to the welding direction (see JP-A-H11-239888).

The process disclosed in JP-A-H11-239888 will be described with reference to cross-section views of FIGS. 12A and 12B.

FIG. 12B is a cross-section view of the weld structure along the line A-A in FIG. 12A.

A first member 21 made of ferritic stainless steel or low-carbon steel, and a second member 22 made of martensitic stainless steel or high-carbon steel are stacked in layers, and the surface of the first member 21 is irradiated with a laser beam.

As shown in FIG. 12B, the molten/solidified part shown as the shaded portion has a cross-sectional structure of an inverted-triangle shape, the width of which is gradually reduced to a direction from the surface of the first member 21 toward the internal area, over the cross-section in the direction perpendicular to the laser-radiation direction.

Moreover, the molten/solidified part has a low-hardness layer 23, and a high-hardness layer 24 at surface and internal sides, respectively.

Furthermore, the high-hardness layer 24 is formed in such a manner that first layers 25, and second layers 26 having hardness lower than the first layers 25 are alternately stacked in layers.

In the process for producing the above weld structure, the surface of the first member 21 is pulse-irradiated with a laser beam.

At first, the first member 21 and the second member 22 are caused to fuse based on a first pulse laser beam, thereby forming a first molten part.

Then, when the growth of solidification of the first molten part reaches half the shifting distance of the laser axis, the irradiation site is slightly shifted, and irradiation of a second pulse laser beam is started.

Accordingly, a second molten part is formed in such a manner that a certain area of the second molten part overlaps the first molten part.

In the same manner, third and subsequent pulse laser beams are successively radiated to the material while the beams are switched on and off at certain intervals, thereby forming a weld structure.

With regard to features of the above weld structure, its cross-section perpendicular to the welding direction (FIG. 12B) has an inverse-triangle shape, as mentioned above.

Furthermore, the first layers 25 and the second layers 26 are alternately stacked along the welding direction in the cross-section in the welding direction (FIG. 12A), and the fusion depth is approximately constant throughout the first layers 25 and the second layers 26.

SUMMARY

An object of the disclosure is to provide a weld structure that has excellent mechanical strength, and a welding process that makes it possible to reliably produce the same.

According to one aspect of the disclosure, provided is a weld structure of metal members, including: a first member; and a second member that is layered together with the first member, wherein at least one first solidified part that extends from a surface of the first member to the inside of the first member, at least one second solidified part that is formed by a molten area extending through the first member and the second member, and at least one third solidified member that is formed by a molten area extending through the first member and the second member are provided, and the third solidified part is located closer to a non-layered surface of the second member than the second member is.

Moreover, according to another aspect of the disclosure, provided is a process for welding metal members, including carrying out each of the following steps at least one time: (i) linearly moving a first laser beam against one of the metal members; and (ii) linearly moving a second laser beam having a power lower than the power of the first laser beam, against the one of the metal members along a track different from a track of the first laser beam.

Furthermore, according to yet another aspect of the disclosure, provided is a process for welding metal members, including carrying out each of the following steps at least one time: (i) moving a first laser beam against one of the metal members in a pattern of concentric circles having different diameters; and (ii) moving a second laser beam having a power lower than the power of the first laser beam, against the one of the metal members along a track different from a track of the first laser beam.

Furthermore, according to still another aspect of the disclosure, provided is a process for welding metal members, comprising carrying out each of the following steps at least one time: (iii) linearly moving a third laser beam against one of the metal members; and (iv) linearly moving a fourth laser beam at a speed higher than the moving speed of the third laser beam, against the one of the metal members, along a track different from a track of the third laser beam.

Furthermore, according to still another aspect of the disclosure, provided is a process for welding metal members, including carrying out each of the following steps at least one time: (iii) moving a third laser beam against one of the metal members in a pattern of concentric circles having different diameters; and (iv) moving a fourth laser beam at a speed higher than the moving speed of the third laser beam, against the one of the metal members, along a track different from a track of the third laser beam.

The disclosure makes it possible to reliably realize high-quality and high-speed welding with respect to welding inexpensive aluminum bus bars and terminals of multiple battery cells in battery systems.

Therefore, the disclosure makes it possible to produce high-capacity, highly-reliable, and cost-effective battery systems, and thus, contributes to popularization of eco cars such as hybrid cars, and electronic vehicles.

DESCRIPTION OF EMBODIMENTS

Figure 1A:
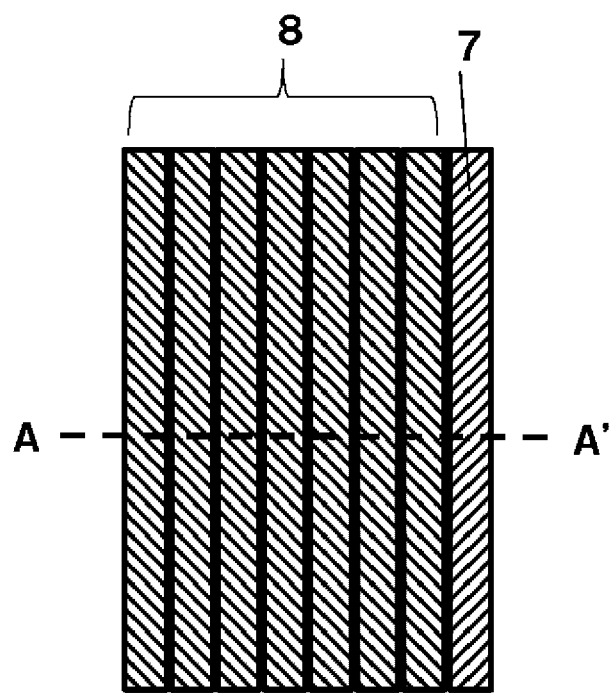
FIG. 1A is a top view that shows a laser-radiation pattern in a first embodiment (Examples 1 and 8).

Prior to descriptions on embodiments of the disclosure, problems in conventional arts will briefly be mentioned.

When the conventional art described in JP-A-H11-239888 is applied to welding of an aluminum bus bar and a nickel-plated copper terminal, the following problems will arise.

With regard to the first problem, irradiation with pulse laser beams is employed in order to alternately layer the first layers 25 and the second layers 26 in the welding direction.

That is, in order to prevent the occurrence of cracks due to solidification in the welding process, rapid-cooling solidification and slow-cooling solidification are repeated in consideration of the time required for solidification of materials melted by prior irradiation with laser pulses, and time until the materials are melted by subsequent irradiation with pulses.

Consequently, the laser-moving speed will be limited by the solidification time, and thus, the laser-moving speed would be increased to only about 5 mm/s to several tens of millimeters per second.

If melting and solidification are not realized in a short time at a high speed such as several hundreds of millimeters per second in cases of heterogeneous-material welding of aluminum and copper, large amounts of intermetallic compounds will be produced in weld interfaces. As a consequence, high weld strength will not be secured.

On the other hand, if the welding speed is lower, it will take longer to join the materials. Therefore, in such a case, the takt time of the welding process will be longer, and it impedes reductions in production costs.

With regard to the second problem, since the weld depths are the same in the first layers 25 and the second layers 26, the produced weld structures would be weak against gaps caused (between the first member 21 and the second member 22) due to variations in the process.

In cases where any gaps are not present, the aluminum will deeply melt into the copper part, and the fusion volume is increased. Therefore, large amounts of intermetallic compounds will be produced, and this results in reductions in the joint strength.

In order to increase the joint strength, it is required that production of intermetallic compounds is suppressed by making the weld depth smaller.

However, if the weld depth is made smaller, the weld depth would become smaller and smaller in cases in which gaps are produced. Consequently, a problem would arise in which the weld strength would be extremely deteriorated.

It would be possible to suppress production of such gaps to a certain degree by contriving effective structures of bus bars and presser jigs.

However, in the practical production process, it is impossible to reliably control gaps with a high degree of accuracy. Therefore, it is impossible to obtain reliable joint strength in cases where gaps are unreliably produced.

In particular, it is difficult to improve peeling strength against stress that is applied to the weld structure in a direction perpendicular to the joint direction. This is because the joint area cannot be increased since the weld depths of the first layers 25 and the second layers 26 are the same. Also, any anchor effects cannot be expected in the interfaces.

Hereinafter, several embodiments of the disclosure will be described with reference to the drawings.

In order to simplify the descriptions, components having substantially the same functions will be shown by use of the same reference symbols.

Relationships between the first to fourth embodiments and corresponding examples are summarized in Table 1.

Each of the embodiments will be described below.

TABLE 1

Figure 1B:
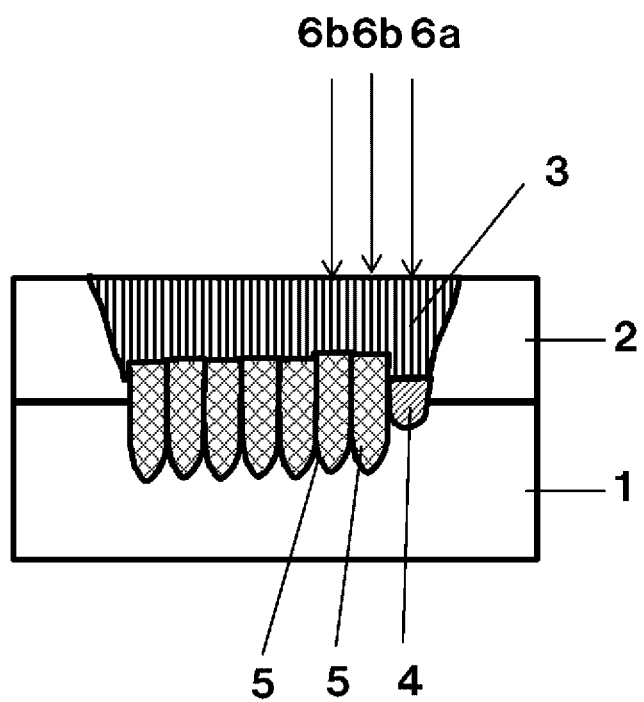
FIG. 1B is a cross-section view in a direction perpendicular to the laser-moving direction, showing a weld structure according to the first embodiment (Examples 1 and 8) in a case where there are no spaces.
Figure 1C:
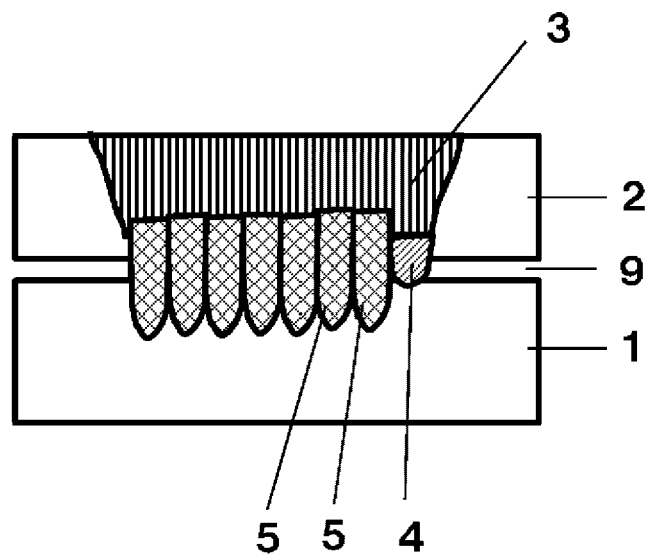
FIG. 1C is a cross-section view in a direction perpendicular to the laser-moving direction, showing a weld structure according to the first embodiment (Examples 1 and 8) in a case where there is a space.
Figure 2A:
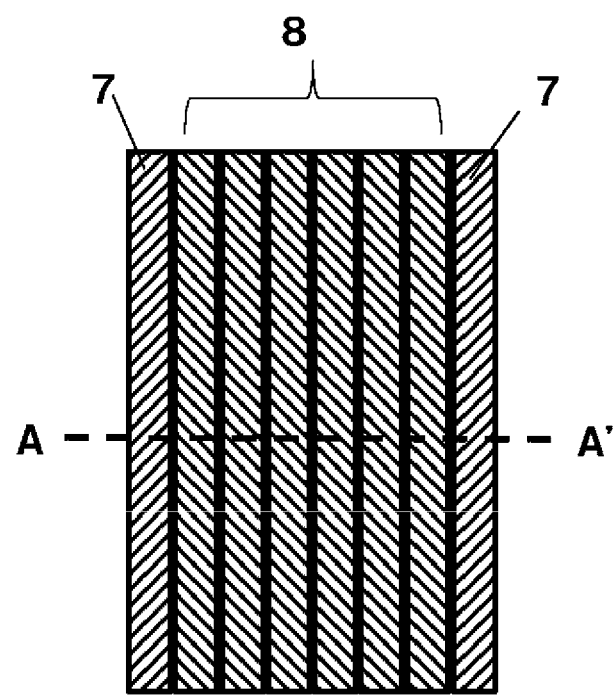
FIG. 2A is a top view that shows a laser-radiation pattern in a first embodiment (Examples 2 and 9).
Figure 2B:
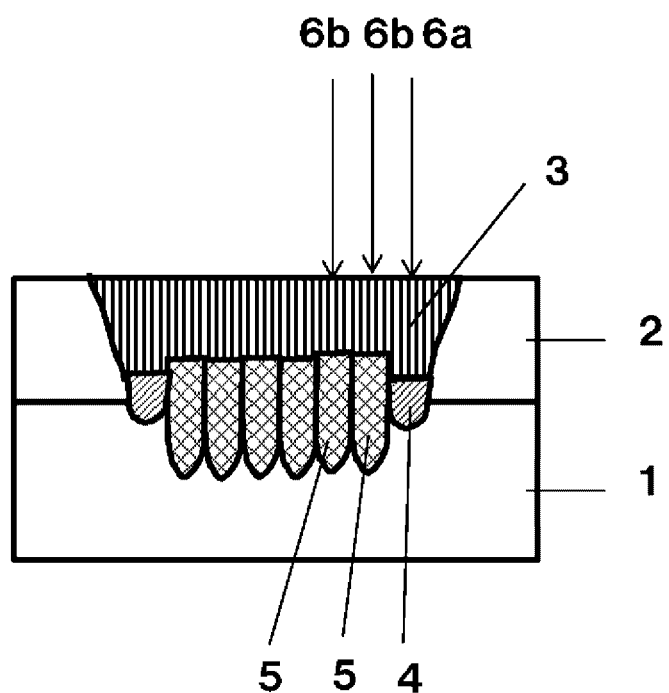
FIG. 2B is a cross-section view in a direction perpendicular to the laser-moving direction, showing a weld structure according to the first embodiment (examples 2 and 9) in a case where there are no spaces.
Figure 2C:
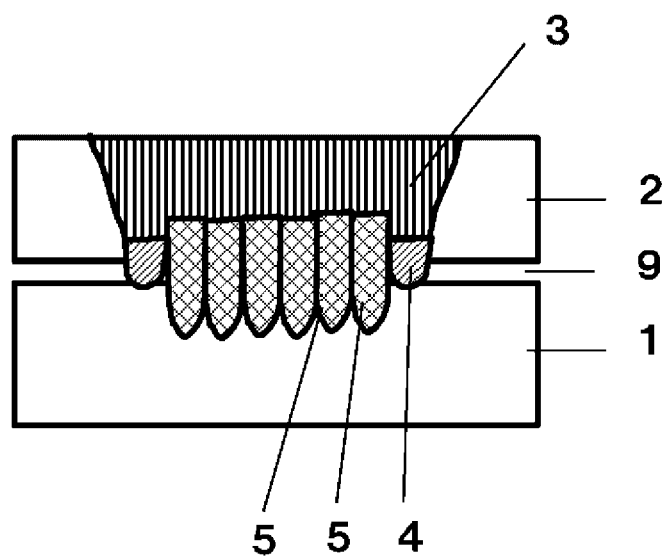
FIG. 2C is a cross-section view in a direction perpendicular to the laser-moving direction, showing a weld structure according to the first embodiment (Examples 2 and 9) in a case where there is a space.
Figure 3A:
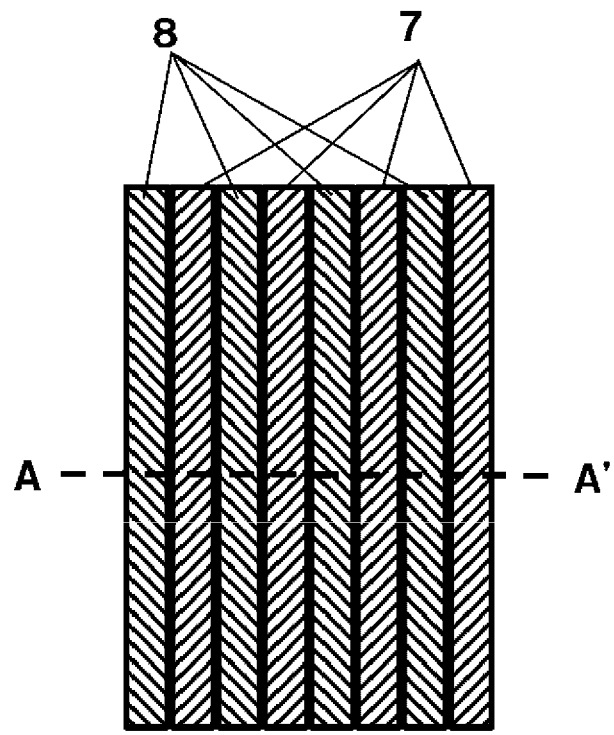
FIG. 3A is a top view that shows a laser-radiation pattern in a first embodiment (Examples 3 and 10).
Figure 3B:
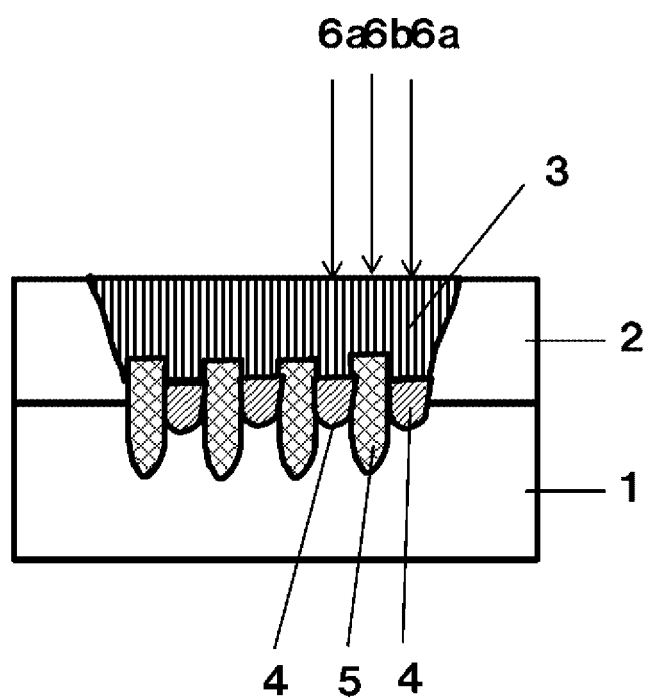
FIG. 3B is a cross-section view in a direction perpendicular to the laser-moving direction, showing a weld structure according to the first embodiment (Examples 3 and 10) in a case where there are no spaces.
Figure 3C:
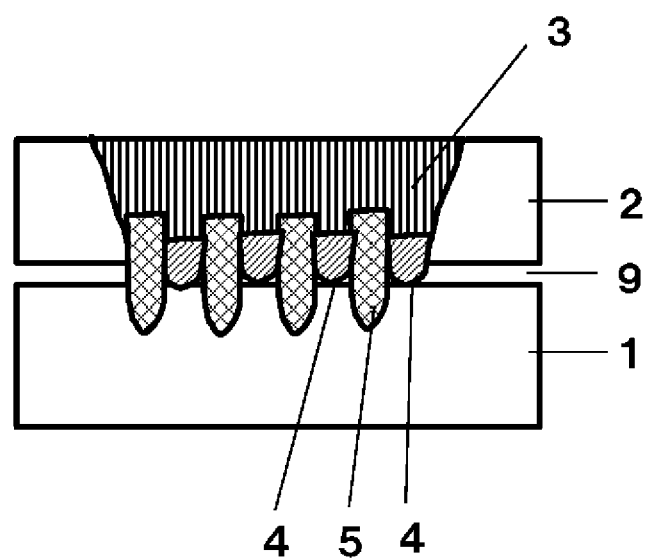
FIG. 3C is a cross-section view in a direction perpendicular to the laser-moving direction, showing a weld structure according to the first embodiment (Examples 3 and 10) in a case where there is a space.
Figure 5A:
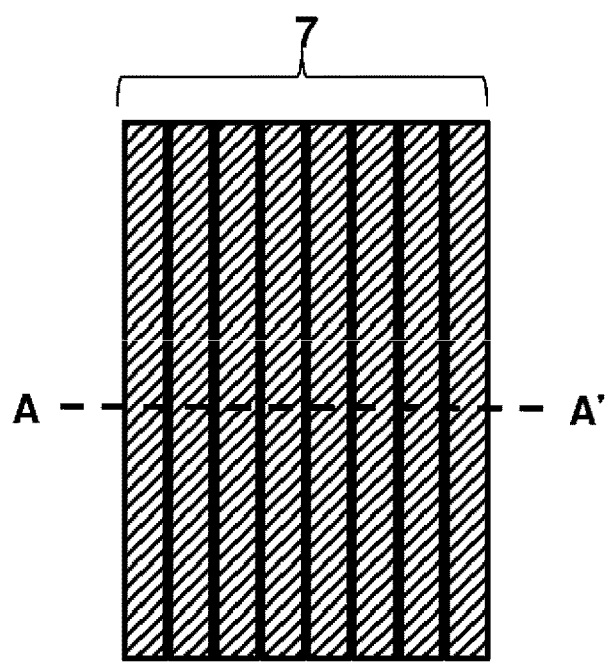
FIG. 5A is a top view that shows a laser-radiation pattern in Comparative Example 1.
Figure 5B:
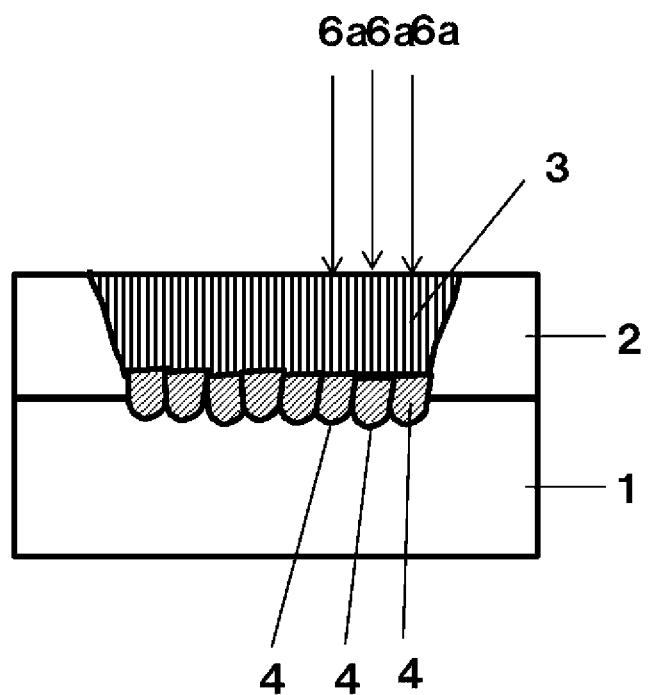
FIG. 5B is a cross-section view in a direction perpendicular to the laser-moving direction, showing a weld structure in Comparative Example 1 in a case where there are no spaces.
Figure 5C:
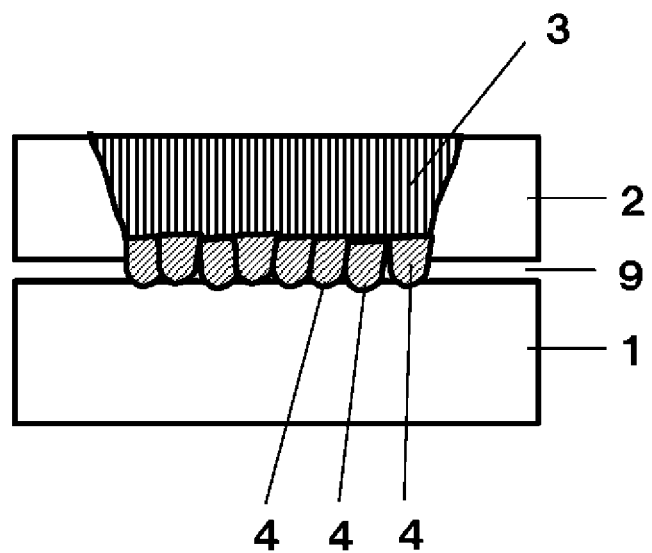
FIG. 5C is a cross-section view in a direction perpendicular to the laser-moving direction, showing a weld structure in Comparative Example 1 in a case where there is a space.
Figure 6A:
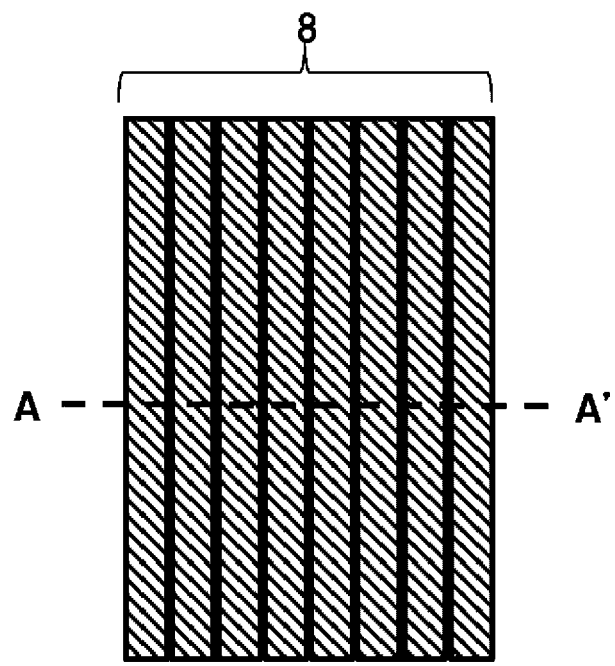
FIG. 6A is a top view that shows a laser-radiation pattern in Comparative Example 2.
Figure 6B:
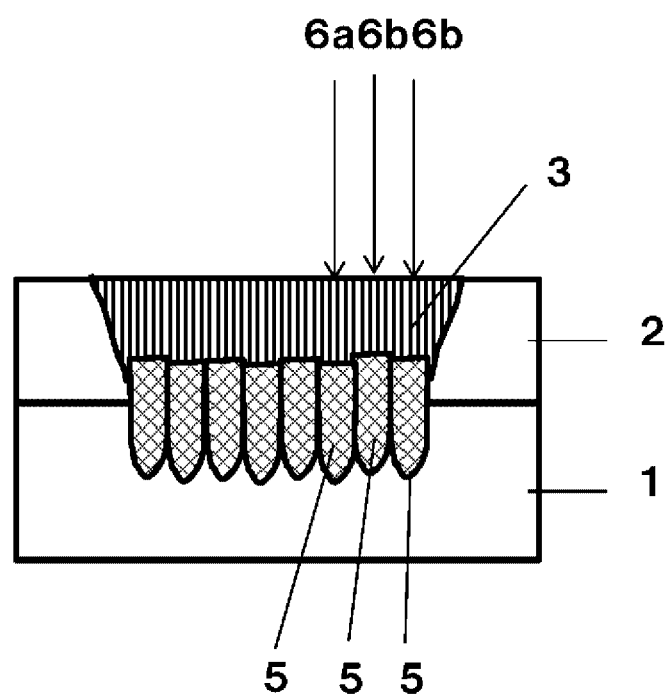
FIG. 6B is a cross-section view in a direction perpendicular to the laser-moving direction, showing a weld structure in Comparative Example 2 in a case where there are no spaces.
Figure 6C:
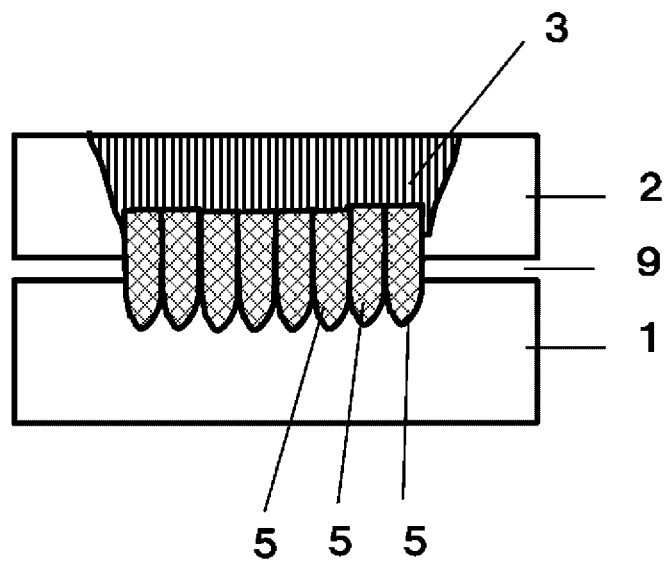
FIG. 6C is a cross-section view in a direction perpendicular to the laser-moving direction, showing a weld structure in Comparative Example 2 in a case where there is a space.
Figure 7A:
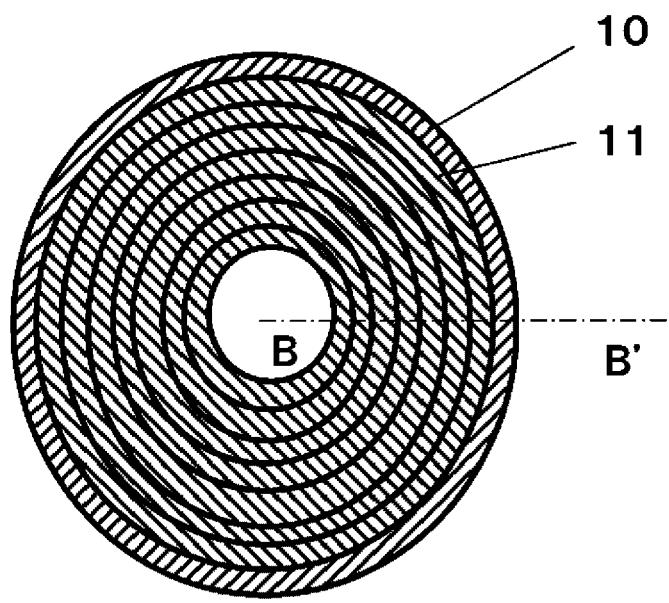
FIG. 7A is a top view that shows a laser-radiation pattern in a second embodiment (Examples 5 and 11).
Figure 7B:
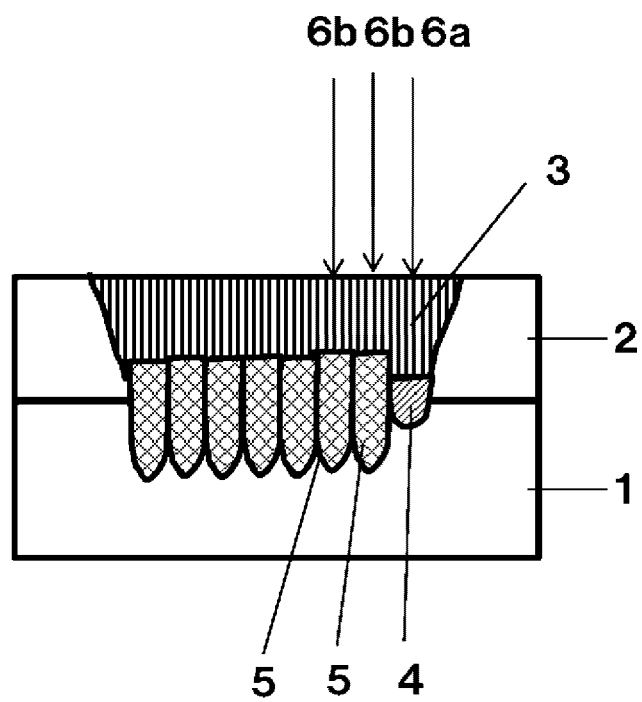
FIG. 7B is a cross-section view in a direction perpendicular to the laser-moving direction, showing a weld structure according to the second embodiment (Examples 5 and 11) in a case where there are no spaces.
Figure 7C:
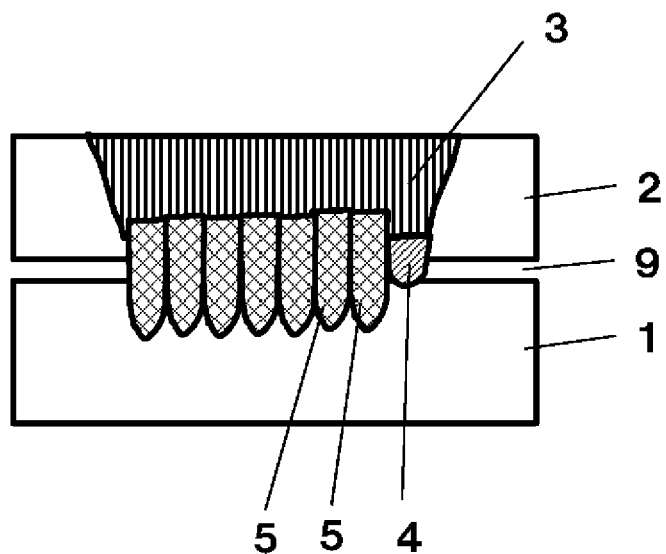
FIG. 7C is a cross-section view in a direction perpendicular to the laser-moving direction, showing a weld structure according to the second embodiment (Examples 5 and 11) in a case where there is a space.
Figure 8A:
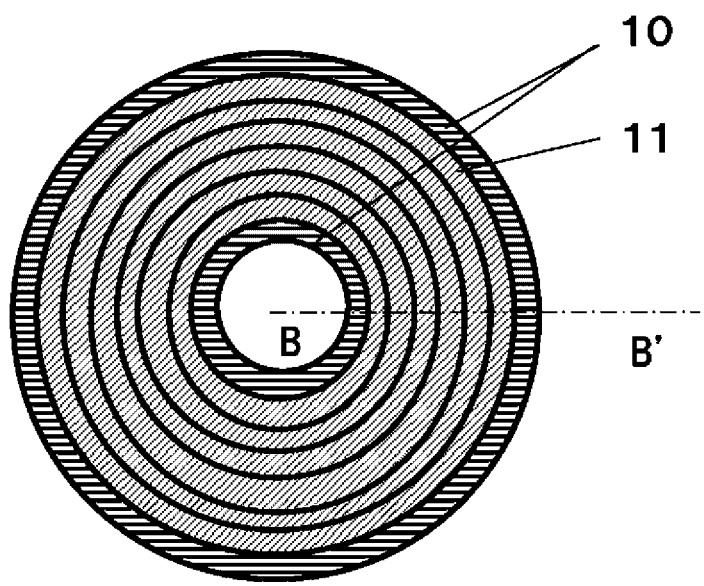
FIG. 8A is a top view that shows a laser-radiation pattern in a second embodiment (Examples 6 and 12).
Figure 8B:
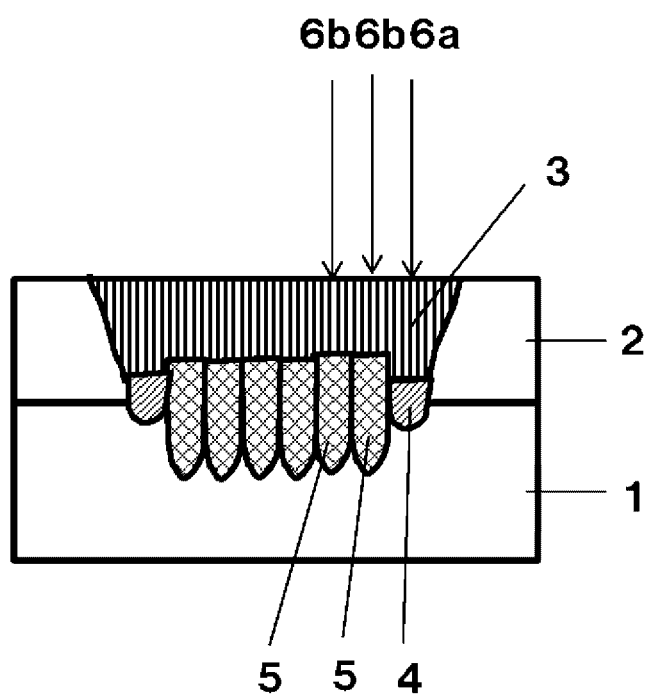
FIG. 8B is a cross-section view in a direction perpendicular to the laser-moving direction, showing a weld structure according to the second embodiment (Examples 6 and 12) in a case where there are no spaces.
Figure 8C:
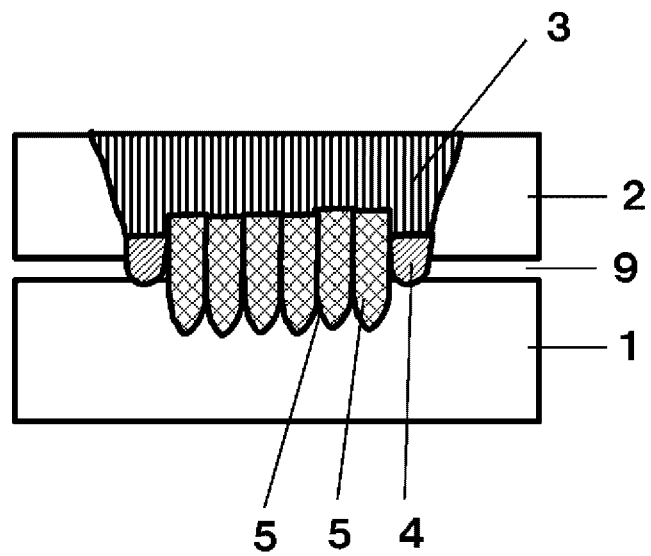
FIG. 8C is a cross-section view in a direction perpendicular to the laser-moving direction, showing a weld structure according to the second embodiment (Examples 6 and 12) in a case where there is a space.
Figure 9A:
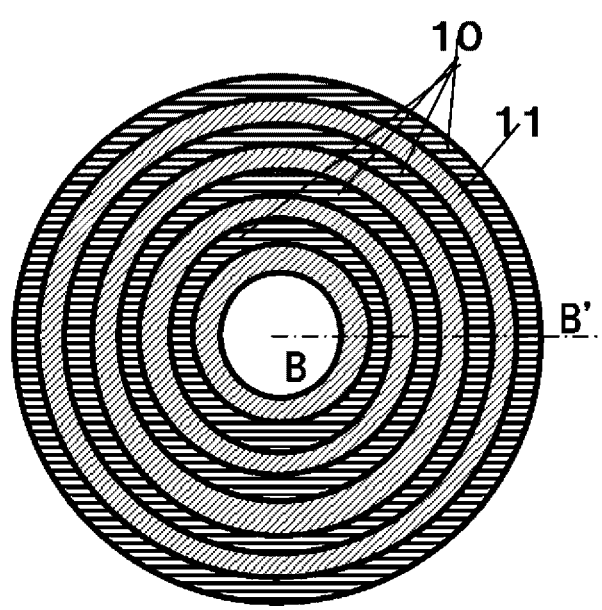
FIG. 9A is a top view that shows a laser-radiation pattern in a second embodiment (Examples 7 and 13).
Figure 9B:
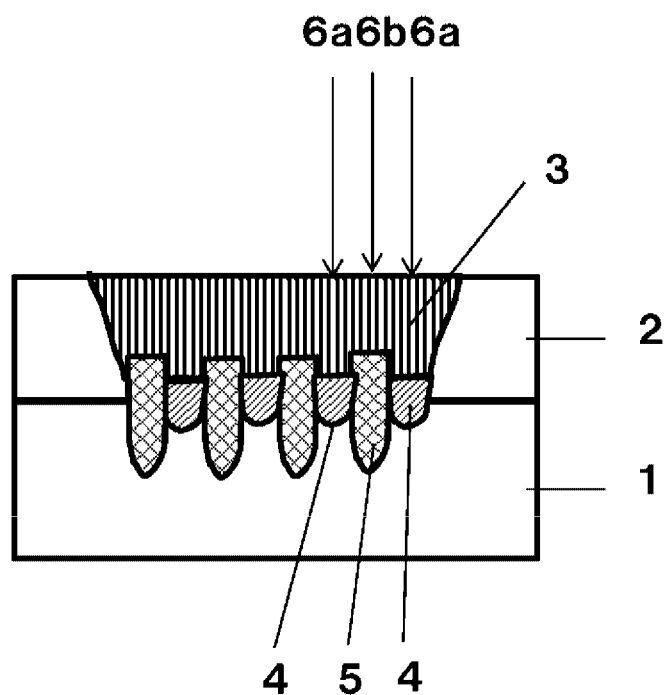
FIG. 9B is a cross-section view in a direction perpendicular to the laser-moving direction, showing a weld structure according to the second embodiment (Examples 7 and 13) in a case where there are no spaces.
Figure 9C:
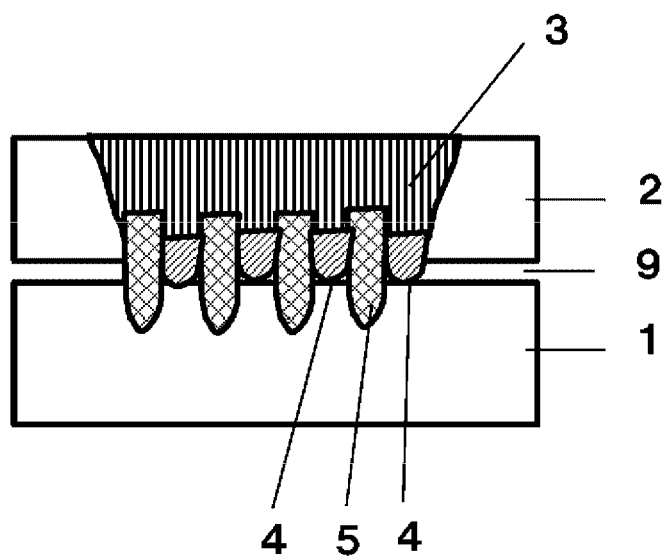
FIG. 9C is a cross-section view in a direction perpendicular to the laser-moving direction, showing a weld structure according to the second embodiment (Examples 7 and 13) in a case where there is a space.

| Embodiments | Tracks of laser beams | Numbers of depthless solidified parts | Laser radiation conditions for depthless/deep solidified parts | Gaps | Corresponding figures | Examples/ Comparative Examples |
|---|---|---|---|---|---|---|
| First Embodiment | Linear | One | Low power/high power | No/Yes | FIGS. 1A-1C | Example 1 |
|  |  | Two |  | No/Yes | FIGS. 2A-2C | Example 2 |
|  |  | The same number as the number of deep solidified parts (the depthless and deep solidified parts were alternately formed.) |  | No/Yes | FIGS. 3A-3C | Example 3 Example 4 (Depth ratio) |
|  |  | Only depthless solidified parts | Low power | No/Yes | FIGS. 5A-5C | Comparative Example 1 |
|  |  | Only deep solidified parts | High power | No/Yes | FIGS. 6A-6C | Comparative Example 2 |
| Second Embodiment | Concentric | One | Low power/high power | No/Yes | FIGS. 7A-7C | Example 5 |
|  |  | Two |  | No/Yes | FIGS. 8A-8C | Example 6 |
|  |  | The same number as the number of deep solidified parts (the depthless and deep solidified parts were alternately formed.) |  | No/Yes | FIGS. 9A-9C | Example 7 |
| Third Embodiment | Linear | One | High-speed operation/low-speed operation | No/Yes | FIGS. 1A-1C | Example 8 |
|  |  | Two |  | No/Yes | FIGS. 2A-2C | Example 9 |
|  |  | The same number as the number of deep solidified parts (the depthless and deep solidified parts were alternately formed.) |  | No/Yes | FIGS. 3A-3C | Example 10 |
| Fourth Embodiment | Concentric | One | High-speed operation/low-speed operation | No/Yes | FIGS. 7A-7C | Example 11 |
|  |  | Two |  | No/Yes | FIGS. 8A-8C | Example 12 |
|  |  | The same number as the number of deep solidified parts (the depthless and deep solidified parts were alternately formed.) |  | No/Yes | FIGS. 9A-9C | Example 13 |

First Embodiment

FIGS. 1A-3C depicts a weld structure between a nickel-plated copper terminal and an aluminum bus bar in a cell in the first embodiment according to the disclosure.

FIG. 1A is a top view of the weld structure when viewed from the side where the aluminum bus bar is present.

FIGS. 1B and 1C are cross-section views of the weld structure along the line A-A' in FIG. 1A.

The same shall apply to FIGS. 2A-3C.

The aluminum bus bar 2 is placed (overlaid) on/over the nickel-plated copper terminal 1.

In that case, by pushing a jig against a surface part of the aluminum bus bar 2 that is not irradiated with the laser beam in a direction from the topside toward the downside in FIG. 1B, a gap 9 between the aluminum bus bar 2 and the nickel-plated copper terminal 1 is made as small as possible, although this is not shown in FIG. 1B.

The aluminum bus bar 2 serves as the first member, while the copper terminal 1 serves as the second member layered together with the first member.

Then, the aluminum bus bar 2 is continuously irradiated with a laser beam 6a adjusted to a certain output power while the laser beam 6a is moved along a track 7 from the top side to the bottom side in FIG. 1A (i.e., from the backside to the front side in FIG. 1B). As a result, the vicinity of an area of the aluminum bus bar 2 that is irradiated with the laser beam 6a is melted.

Then, the molten aluminum is solidified when the laser beam 6a moves farther away therefrom, and an area extending from the surface of aluminum bus bar 2 to the vicinity of the interface in the aluminum bus bar 2 forms an aluminum-solidified part 3.

Meanwhile, a molten area extending from the vicinity of the interface in aluminum bus bar 2 to the vicinity of the interface in the nickel-plated copper terminal 1, the aluminum, and a slight amount of the plated nickel, and the copper are melted and mixed with each other. When the laser beam 6a moves far away therefrom, the molten part forms the depthless solidified parts 4 of an alloy.

Then, along the tracks 8 shown in FIG. 1A, a laser beam 6b that has higher power compared with the power of the laser beam 6a moved along the track 7 is caused to move from the topside to the bottom side in the figure (i.e., from the backside to the frontside in FIG. 1B).

Then, when the laser beam 6b moves faraway from the molten area, the molten aluminum is solidified. Thus, an area extending from the surface of the aluminum bus bar 2 to the vicinity of the interface in the nickel-plated copper terminal 1 forms a solidified part 3 of aluminum.

Meanwhile, in a molten area extending from the vicinity of the interface in the aluminum bus bar 2 to the vicinity of the interface in the nickel-plated copper terminal 1, the aluminum, a slight amount of the plated nickel, and the copper are melted, and, are mixed together extending to a deep area, since the power of the laser beam 6b is higher than the power of the laser beam 6a.

As a result, when the laser beam 6b moves far away from the molten area, the molten area forms a deep solidified part 5 of an alloy.

Subsequently, the laser beam 6b caused to deviate from the above track is radiated to the surface of the aluminum bus bar 2 while the laser beam 6b is moved over the aluminum bus bar 2 in FIG. 1B. Thus, in the same manner, an area of the aluminum bus bar 2 near its surface forms an aluminum-solidified part 3, while an area around the interface forms a deep alloy-solidified part 5.

By successively displacing and moving the laser beam over the surface of the aluminum bus bar 2 in the same manner, the weld structure shown in FIG. 1B is produced.

In this weld structure, the solidified part 3 is referred to as a first solidified part extending from the surface of the first member to its internal area, and the solidified part 4 is referred to as a second solidified part that is formed through fusion of the area extending through the first member and the second member.

The solidified part 5 is formed through fusion of the area extending through the first member and the second member, and is referred to as a third solidified part that is located closer to the non-layered surface of the second member than the second solidified part is.

In FIG. 1B, the temperature of the molten area forming the depthless alloy-solidified part 4 is lower since the power of the laser beam 6a is lower.

Therefore, when the laser beam 6a is moved away from the molten part, the molten part is quickly solidified.

Accordingly, the melting time is shorter. Therefore, intermetallic compounds are not produced, but ordinary alloys (having many lattice defects) are produced.

As a result, misalignment of the lattices is easily caused by tensile stress, and thus, a reliable weld structure is produced so as to alleviate the tensile stress.

On the other hand, the temperature of the molten area forming the solidified part 5 is higher than the temperature of the molten area forming the solidified part 4 since the power of the laser beam 6b for forming the solidified part 5 is higher than the power of the laser beam 6a for forming the solidified part 4.

Therefore, it takes much longer until the molten part is solidified to form the solidified part 5, after the laser beam 6b is moved away from the molten part.

As a result, intermetallic compounds having few lattice defects are produced therein.

In such intermetallic compounds, it is difficult for misalignment of lattices to occur due to tensile stress. Therefore, such stress cannot be alleviated by the intermetallic compounds.

For this reason, the solidified part 5 has characteristics that detachment of lattices would easily occur even when it receives lower tensile tension, and it has lower tensile strength, compared with the solidified part 4.

Even in cases where there are few gaps 9 between the aluminum bus bar 2 and the nickel-plated copper terminal 1 as shown in FIG. 1B, high strength can be secured by the presence of the solidified part 4.

Furthermore, in cases where a gap 9 is caused between the aluminum bus bar 2 and the nickel-plated copper terminal 1 due to production variations, as shown FIG. 1C, the depthless solidified part 4 is not almost fused with the copper terminal 1. Thus, insufficient tensile strength due to the presence solidified part 4 would be expected.

However, in such cases, the deep solidified parts 5 are fused with the copper terminal 1 over a wide area. Therefore, although each of the solidified parts 5 only has low tensile strength, the solidified parts 5 can form a joint area having larger tensile strength as a whole.

As described above, at least one deep solidified part 5 that is formed by irradiation with a laser beam having larger energy, and at least one depthless solidified part 4 that is formed by irradiation with a laser beam having smaller energy are provided in the cross-section perpendicular to the welding direction.

Accordingly, either in cases where there are few gaps 9 between the aluminum bus bar 2 and the nickel-plated copper terminal 1, or in cases where a large gap 9 is caused therebetween, due to occurrence of production variations, a reliable weld structure having higher joint strength can be produced based on inexpensive presser jigs.

Even the presence of one depthless solidified part 4 can ensure effects to maintain sufficient joint strength even in cases where there are few gaps 9 as mentioned above. However, the presence of two or more depthless solidified parts 4 is preferable since stress will not focus on one location but will be dispersed.

In such cases, for the same reason as cases where the gap 9 is present, the presence of two or more deep solidified parts 5 is also preferable.

An example of the above-mentioned preferable embodiment, in which six deep solidified parts 5 are provided around the central area, and two depthless solidified parts 4 are present at both sides, is depicted in FIG. 2A (showing tracks of laser beams), and FIGS. 2B and 2C (each showing cross-sections thereof).

Additionally, although depthless solidified parts 4 are provided at the both sides in FIG. 2A, these members are not necessarily provided at both sides.

No problems arise no matter where depthless solidified parts 4 are provided. Furthermore, three or more depthless solidified parts 4 may be provided.

FIGS. 3A-3C shows a case in which depthless solidified parts 4, and deep solidified parts 5 are alternately provided, and the numbers of these members are the same.

Since tensile stress is evenly dispersed across the entirety of the welded part, stress will not focus on a certain location, and the welded part has improved resistance against breakage, and becomes stable. Therefore, the above case is the most preferable.

EXAMPLE 1

EXAMPLE 1 will be described below.

In FIG. 1B, an aluminum bus bar 2 having a thickness of 1 mm was placed on a copper terminal 1 that is 2 mm thick and that is plated with nickel under conditions where the plating thickness was 6 μm.

By pushing a presser jig (not shown in the figure) against the aluminum bus bar 2 to the direction from the top side toward the bottom side, the above members are disposed so as not to form any gaps 9 therebetween as much as possible.

In order to form a depthless solidified part 4, the surface of the aluminum bus bar 2 was irradiated with a laser beam 6a with a power of 800 W from a fiber laser while the laser beam 6a was moved along a track 7 (FIG. 1A) at a speed of 500 mm/s over a distance of 10 mm.

Then, by displacing the radiation site from the track 7 to the horizontal direction by 0.1 mm, a laser beam 6b with 1000 W was radiated and moved along one of the tracks 8 at a speed of 800 mm/s in the same manner in order to form a deep solidified part 5.

The laser radiation was repeated 7 times by successively displacing the radiation site by 0.1 mm in the same manner.

In this example, three samples were prepared, and values of tensile strength (peeling strength) toward the upper direction in FIG. 1B were measured for these samples. As a result, their tensile strengths were 170 N, 133 N, and 127 N, and thus, all of the samples exhibited high tensile strengths exceeding 100 N were realized.

Tensile strength 30 N or higher would be sufficient.

Preferably, the tensile strength is 90 N or higher.

Additional examples described below also exhibited higher tensile strengths in the same manner.

Next, as shown in FIG. 1C, an aluminum bus bar 2 was placed over a nickel-plated copper terminal 1 in such a manner that a gap 9 of 0.1 mm is provided.

Then, the prepared structure was subjected to the welding process in the above-described manner.

In this case, tensile strengths of three samples were 183 N, 198 N, and 145 N. Thus, even in the cases in which there is a gap 9 of 0.1 mm, high tensile strengths exceeding 100 N were realized.

Moreover, the welding process was carried out by modifying a laser-radiation pattern such that the depthless solidified part 4 was produced in the fourth location from the outermost right side in FIG. 1B, with respect to samples in which there are no gaps 9, and samples in which there are gaps 9 of 0.1 mm. As a result, all of the samples exhibited high tensile strength exceeding 100 N in the same manner, regardless of the presence of gap 9.

Furthermore, the welding process was carried out by changing a laser-radiation pattern such that the depthless solidified part 4 was produced at the outermost left side in FIG. 1B, with respect to samples in which there are no gaps 9 and samples in which there are gaps 9 of 0.1 mm. As a result, all of the samples exhibited high tensile strength exceeding 100 N in the same manner, regardless of the presence of gap 9.

Thus, by forming at least one depthless solidified part 4, and multiple deep solidified parts 5, stable weld structures could be realized regardless of the presence or absence of gap 9.

Additionally, in this example, some examples of the plating thickness, and the thickness of the bus bar are shown. However, the disclosure is not limited to the values described in this example.

Moreover, conditions such as a laser output, welding speed, and laser scanning intervals depend on materials and surface states of metal members subjected to the welding process, thickness of the member, and total thermal capacities including jigs. Therefore, conditions are not limited to the above specifications.

Furthermore, although only three cases in which the depthless solidified parts are provided at the outermost right side, at the fourth location from the right side, and the outermost left side are described in this example, the same effects will be obtained no matter where the depthless solidified part is provided.

EXAMPLE 2

A welding process was carried out in the same manner as EXAMPLE 1 except that arrangements of the track 7 of the laser beam 6a for forming a depthless solidified part 4, and tracks 8 of laser beams 6b for forming deep solidified parts 5 were modified.

As shown in FIG. 2B, an aluminum bus bar 2 was placed on a nickel-plated copper terminal 1 such that any gaps 9 are not formed therebetween.

Next, a laser radiation pattern (FIG. 2A) was adjusted such that two depthless solidified parts 4 were formed at the outermost right and left sides, and then, a welding process was carried out in the same manner as EXAMPLE 1.

In this example, tensile strengths were also measured, and samples exhibited 181 N, 153 N, and 161 N. Thus, all of the samples exhibited high joint strengths exceeding 100 N were realized.

Next, as shown in FIG. 2C, an aluminum bus bar 2 was placed on a nickel-plated copper terminal 1 in such a manner that a gap 9 of 0.1 mm is provided, and then, the prepared samples were subjected to the welding process in the above manner.

In this case, when tensile strengths of the samples were measured, they were 144 N, 152 N, and 177 N. Thus, all of the samples exhibited high tensile strengths exceeding 100 N were realized.

Moreover, the welding process was carried out by changing a laser-radiation pattern such that the depthless solidified parts 4 were produced at the outermost right side, and at the fourth location from the right side, in FIG. 2A, with respect to samples in which there are no gaps 9, and samples in which there are gaps 9 of 0.1 mm. As a result, all of the samples exhibited high tensile strength between 150 N and 190 N, regardless of the presence of gap 9.

Furthermore, the welding process was carried out by changing a laser-radiation pattern such that the depthless solidified parts 4 were produced at the fourth location from the right side, and at the outermost left side, with respect to samples in which there are no gaps 9 and samples in which there are gaps 9 of 0.1 mm. As a result, all of the samples exhibited high tensile strength between 150 N and 190 N, regardless of the presence of gap 9 in the same manner.

Thus, by forming two depthless solidified part 4, and multiple deep solidified parts 5, stable weld structures could be realized regardless of the presence or absence of gap 9.

Furthermore, although only three cases in which the depthless solidified parts 4 are provided i) at the outermost right and left sides, ii) at the outermost right side and the fourth location from the right side, and iii) at the fourth location from the right side and the outermost left side are described in this example, the same effects will be obtained even when the depthless solidified parts are provided at any location.

EXAMPLE 3

A welding process was carried out in the same manner as EXAMPLE 1 except that arrangements of the track 7 of the laser beam 6a for forming a depthless solidified part 4, and tracks 8 of laser beams 6b for forming deep solidified parts 5 were modified.

As shown in FIG. 3B, an aluminum bus bar 2 was placed on a nickel-plated copper terminal 1 such that any gaps 9 are not formed therebetween.

Then, a laser radiation pattern was adjusted so as to produce a weld structure in which depthless solidified parts 4 and deep solidified parts 5 were alternately provided (FIG. 3A), and thus, a welding process was carried out in the same manner as EXAMPLE 1.

In that case, when tensile strengths were measured with respect to prepared samples, the measured values were 163 N, 177 N, and 165 N. Thus, all of the samples exhibited high joint strengths exceeding 100 N were realized.

Next, as shown in FIG. 3C, an aluminum bus bar 2 was placed on a nickel-plated copper terminal 1 in such a manner that a gap 9 of 0.1 mm is provided, and then, the prepared samples were subjected to the welding process in the above manner.

In that case, when tensile strengths of the prepared samples were measured, they were 166 N, 163 N, and 178 N. Thus, all of the samples exhibited high tensile strengths exceeding 100 N were realized.

Thus, by forming depthless solidified part 4 and deep solidified parts 5 alternately, stable weld structures could be realized regardless of the presence or absence of gap 9.

In addition, although, in this example, one depthless solidified parts 4 was formed at the outermost right, and then, deep solidified parts 5 and additional depthless solidified parts 4 were alternately formed, the same effects can be obtained even in cases in which one deep solidified part 5 is formed at first, and then, depthless solidified parts 4 and additional deep solidified parts 5 are formed.

EXAMPLE 4

The ratios between depths of depthless solidified parts 4 and depths of deep solidified parts 5, and their relationship to joint strength were studied.

In order to test joint strength, measurements of tensile strengths (peeling strengths) toward the top side of the aluminum bus bar 2 in FIG. 3B were carried out.

The nickel-plated copper terminal 1 was gripped with a vise, and a non-welded part of the aluminum bus bar 2 was pulled upward with a clamp at a constant speed.

A value in the force gauge that indicated when the nickel-plated copper terminal 1 was detached from the structure was considered as a tensile strength.

As shown in FIG. 3B, the aluminum bus bar 2 was placed over the nickel-plated copper terminal 1 such that there are no gaps 9 therebetween. Then, a welding process was carried out in such a manner that one depthless solidified part 4 was formed at the outermost right side, and then, depthless solidified part 4 and deep solidified parts 5 were alternately formed on the left hand side.

In that case, the output of the laser beam 6a for forming the depthless solidified parts 4 was set to 800 W, while outputs of the laser beams 6b for forming the deep solidified parts 5 were set to 900 W, 1000 W, 1100 W, 1200 W, 1300 W, and 1400 W, thereby forming weld structures.

The moving speed of both of the laser beams was a constant speed of 500 mm/s.

Subsequently, as shown in FIG. 3C, the aluminum bus bars 2 were placed on the nickel-plated copper terminals 1 in such a manner that gaps 9 of 0.1 mm were provided therebetween, and then, each of the structures was subjected to the same welding process.

Relationships among laser outputs, ratio of depths, and tensile strengths in the above cases are shown in Table 2.

Figure 4:
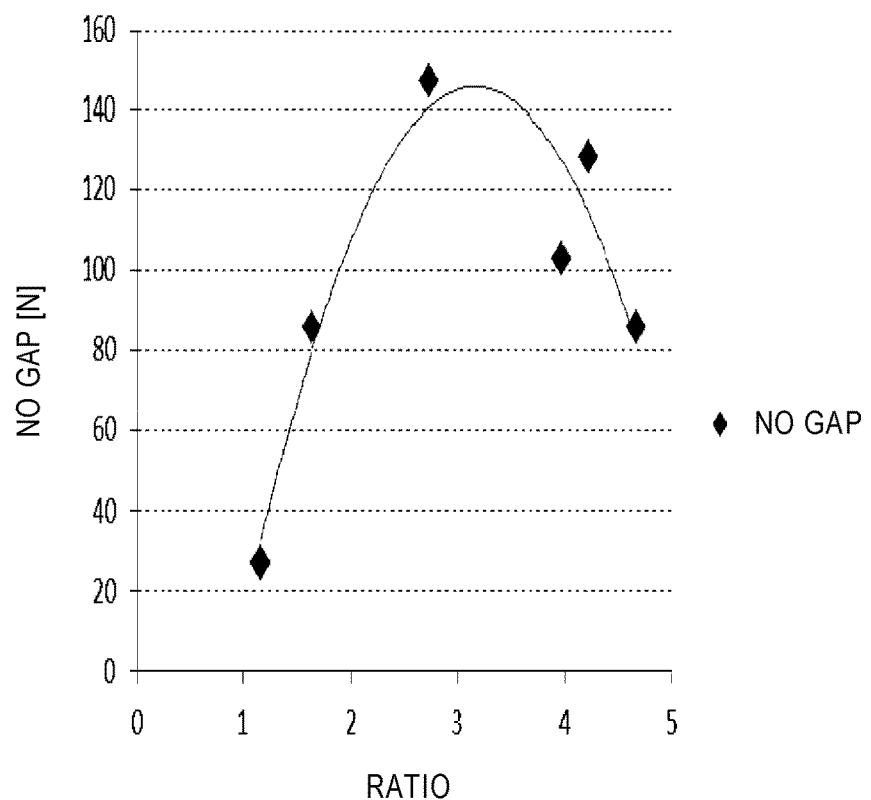
FIG. 4 is a diagram that shows relations between the tensile strength and depth ratios.

In FIG. 4, the relationship between tensile strengths and ratio of depths in cases in which there were no gaps 9 are shown.

Samples that exhibited tensile strengths of 100 N or higher were considered acceptable.

The above threshold is one of the requirements for battery performance.

In addition, the depths refer to mean values.

According to Table 2, when outputs of laser beams 6b for forming deep solidified parts 5 were 900 W, the depths of the formed deep solidified parts 5 were smaller, and produced weld structures that had lower joint strengths.

When the outputs were increased to 1000 W or higher, depths of the formed deep solidified parts 5 became larger, and the produced weld structures had improved joint strengths with increases of the depths.

According to the cases in which the outputs were 1000 W and there were no gaps 9, it was confirmed that effects to improve joint strengths were brought about, when ratios of deep solidified parts 5 to depthless solidified parts 4 were 1.64 or higher.

It would be sufficient that the ratios are at least 1.5.

Additionally, the laser outputs and welding speeds shown are merely examples. Optimum values for theses parameters vary with plating thicknesses, thicknesses of terminals, and thicknesses of bus bars.

In addition, these parameters also depend on materials, surface states of metal members subjected to the welding process, thickness of the member, and total thermal capacities including jigs.

Therefore, in the disclosure, the parameters are not limited to the above-described values.

COMPARATIVE EXAMPLE 1

Welding processes were carried out in the same manner as EXAMPLE 1 except that only depthless solidified parts 4 were formed in weld structures.

Tracks of laser beams are shown in FIG. 5A, and cross-sections of joint areas are shown FIGS. 5B and 5C.

Tensile strengths of samples in this comparative example were also measured, and the measured values were 198 N, 205 N, and 177 N. All of the samples had high joint strengths exceeding 100 N.

Next, results for samples in which gaps 9 of 0.1 mm were provided are shown in FIG. 5C.

Tensile strengths of these samples were also measured, and the measured values were 15 N, 7 N, and 49 N. All of the samples had low joint strengths below 100 N.

In weld structures having only depthless solidified parts 4 and not having any gaps 9, production of intermetallic compounds is suppressed, and ordinary alloy layers tolerant to stress are produced. Therefore, such weld structures had higher joint strength, and thus, can alleviate tensile stress.

On the other hand, in weld structures having gaps 9, areas of fusion of the nickel-plated copper terminals 1 and alu-

TABLE 2

| | No gaps | | | | | Gap of 0.1 mm | | | | |
|---|---|---|---|---|---|---|---|---|---|---|
| Output power for deep solidified parts | Depths of depthless solidified parts | Depths of deep solidified parts | Ratios of depths | Tensile strengths | Evaluation | Depths of depthless solidified parts | Depths of deep solidified parts | Ratios of depths | Tensile strengths | Evaluation |
| 900 W | 31 μm | 36 μm | 1.16 | 27N | Inferior | 0 μm | 33 μm | — | 4N | Inferior |
| 1000 W | 33 μm | 54 μm | 1.64 | 86N | Fair | 29 μm | 69 μm | 2.38 | 101N | Superior |
| 1100 W | 37 μm | 101 μm | 2.73 | 147N | Superior | 36 μm | 98 μm | 3.38 | 129N | Superior |
| 1200 W | 36 μm | 152 μm | 4.22 | 128N | Superior | 41 μm | 144 μm | 3.51 | 151N | Superior |
| 1300 W | 43 μm | 171 μm | 3.98 | 103N | Superior | 44 μm | 170 μm | 3.86 | 122N | Superior |
| 1400 W | 45 μm | 210 μm | 4.67 | 86N | Fair | 47 μm | 211 μm | 4.49 | 93N | Fair | minum bus bars 2 producing the alloys are extremely reduced, and the produced weld structures had significantly deteriorated joint strengths.

Thus, in cases where any formation of gaps 9 can be prevented, it would be possible to ensure high joint strengths. However, in actual production, it is difficult to reliably and stably avoid formation of gaps 9, and therefore, it would be impossible to ensure stable production.

COMPARATIVE EXAMPLE 2

Welding processes were carried out in the same manner as EXAMPLE 1 except that only deep solidified parts 5 were formed in weld structures.

Tracks of laser beams are shown in FIG. 6A, and cross-sections of the joint areas are shown in FIG. 6B and FIG. 6C.

Tensile strengths of these samples were measured, and the measured values were 52 N, 83 N, and 77 N. All of the samples had joint strengths below 100 N.

Next, results for samples in which gaps 9 of 0.1 mm were provided are shown in FIG. 6C.

Tensile strengths of these samples were also measured, and the measured values were 76 N, 74 N, and 57 N. All of the samples had joint strengths similar to those of the samples in which any gaps 9 were not formed.

In the weld structures having only deep solidified parts 5 and not having any gaps 9, large amounts of intermetallic compounds were produced, and thus, the weld structures were not able to alleviate to tensile stress.

Therefore, compared with the samples not having any gaps 9 in COMPARATIVE EXAMPLE 1, the weld structures not having any gaps 9 in this comparative example had only about half or less than half of the joint strengths.

In the weld structures having gaps 9, large amounts of intermetallic compounds are produced inside nickel-plated copper terminals 1, and therefore, the weld structures had joint strengths similar to those of the samples not having any gaps 9.

When outputs of radiated laser beams are increased in this manner, certain degrees of joint strengths can be obtained regardless of the presence of gap 9.

However, high joint strengths cannot reliably be obtained in cases of narrower joined areas, and therefore, in processes for welding of bus bars that require high joint strength, larger areas need to be welded. This makes it difficult to produce weld structures at lower costs.

Based on the above results, according to the techniques described in EXAMPLES 1, 2 and 3, reliable welding processes will be realized regardless of the presence of gap 9, and cost-effective welding processes that promise higher yields can be realized.

Second Embodiment

FIG. 7A is a plan view that shows moving directions of laser beams in the second embodiment.

FIG. 7B is a cross-section view that describes a weld structure of a nickel-plated copper terminal 1 and an aluminum bus bar 2 in a cell in the second embodiment.

FIGS. 7B and 7C are cross-sections of the weld structure along the line B-B' in FIG. 7A.

FIG. 7C is a cross-section of a joint area of a weld structure in which a gap 9 of 0.1 mm is provided.

The routes (tracks) of movement of laser beams in the second embodiment differ from those described in the first embodiment.

That is, the laser beams are moved in concentric patterns.

EXAMPLE 5

Welding processes were carried out in the same manner as EXAMPLE 1 except that tracks 10 of laser beams 6a for forming depthless solidified parts 4, and tracks 11 of laser beams 6b for forming deep solidified parts 5.

As shown in FIG. 7B, aluminum bus bars 2 were placed on nickel-plated copper terminals 1 in such a manner that any gaps 9 are not formed therebetween. Then, the welding process was carried out such that depthless solidified parts 4 were formed at the outermost side, and deep solidified parts 5 were formed medial to the depthless solidified parts 4 (at the left sides in the figure).

Furthermore, weld structures in which solidified parts 4 and solidified parts 5 are successively provided were produced.

The laser radiation pattern in this example is shown in FIG. 7A.

A laser beam 6a that had an output of 800 W and that was emitted from a fiber laser was moved along a circular track 10 with a diameter of 5 mm at a speed of 500 mm/s.

Then, A laser beam 6a having an output of 1000 W was moved along a concentric circular track 11 with a diameter of 4.8 mm at a speed of 800 mm/s in the same manner.

Laser beams were successively moved over the aluminum bus bars 2 in circular patters while the diameter of the circular track is reduced by 0.2 mm, and thus, the step of moving the laser beam in the circular pattern was repeated 7 times in total.

In this example, three samples were prepared in the above manner, and their tensile strengths (peeling strengths) were measured for these samples. As a result, their tensile strengths were 159 N, 140 N, and 183 N, and thus, all of the samples exhibited high tensile strengths exceeding 100 N were realized.

A case of a weld structure in which a gap 9 is provided is shown in FIG. 7C.

Aluminum bus bars 2 were placed over nickel-plated copper terminals 1 in such a manner that gaps 9 of 0.1 mm were formed therebetween. Then, the produced structures were subjected to the above welding process.

Tensile strengths of these samples were also measured, and the measured values were 177 N, 186 N, and 170 N. All of the samples had high joint strengths exceeding 100 N.

Thus, by forming at least one depthless solidified parts 4, and multiple deep solidified parts 5 in weld structures, reliable welding processes could be realized regardless of the presence of gaps 9.

In addition, conditions such as laser outputs, welding speed, and scanning intervals shown in this example depend on materials and surface conditions of welding metal members, thicknesses of the plates, and total thermal capacity of members including jigs, and therefore, conditions for the welding process are not limited to those described above.

Furthermore, only cases in which one depthless solidified part 4 was provided at the outermost side are described in this example. However, no matter where the depthless solidified part 4 is located, the same effects can be obtained.

With regard to the order of radiation, the welding mechanism is the same in either cases where the welding process is started from the outer side or cases where the welding process is started from the inner side. Therefore, even when the radiation is carried out in any orders, the same effects can be obtained.

EXAMPLE 6

Welding processes were carried out in the same manner as EXAMPLE 5 except that arrangements of tracks 10 of laser beams 6*a* for forming depthless solidified parts 4, and tracks 11 of laser beams 6*b* for forming deep solidified parts 5.

As shown in FIG. 8B, aluminum bus bars 2 were placed on nickel-plated copper terminals 1 in such a manner that any gaps 9 are not formed therebetween. Then, the welding process was carried out in the laser radiation pattern shown in FIG. 8A in the same way as described above, such that two depthless solidified parts 4 were formed at the outermost side and at the innermost side.

Tensile strengths of these samples were also measured, and the measured values were 165 N, 163 N, and 148 N. All of the samples had high joint strengths exceeding 100 N.

Next, as shown in FIG. 8C, the aluminum bus bars 2 were placed on the nickel-plated copper terminals 1 in such a manner that gaps 9 of 0.1 mm were provided therebetween, and then, each of the structures was subjected to the same welding process.

Tensile strengths of these samples were also measured, and the measured values were 152 N, 128 N, and 138 N. All of the samples had high joint strengths exceeding 100 N.

Next, welding processes were carried out in the same manner as described above except that the laser radiation pattern was modified such that depthless solidified parts 4 were formed at the outermost side, and at the fourth location from the outermost side in FIGS. 8B and 8C. As a result, high tensile strengths between 120 N and 170 N were realized in either weld structures having no gaps 9 or weld structures having gaps of 0.1 mm.

Furthermore, welding processes were carried out in the same manner as described above except that the laser radiation pattern was modified such that depthless solidified parts 4 were formed at the fourth location from the outermost side, and at the innermost side. As a result, high tensile strengths between 120 N and 170 N were realized in either weld structures having no gaps 9 or weld structures having gaps of 0.1 mm.

Thus, by forming two depthless solidified parts 4, and multiple deep solidified parts 5 in weld structures, reliable welding processes could be realized regardless of the presence of gaps 9.

Furthermore, although only three cases in which the depthless solidified parts 4 are provided i) at the outermost side and at the innermost side, ii) at the outermost side and the fourth location from the outermost location, and iii) at the fourth location from the outermost side and at the innermost side are described in this example, the same effects will be obtained even when the depthless solidified parts are provided at any location.

EXAMPLE 7

A welding process was carried out in the same manner as EXAMPLE 6 except that arrangements of the track 10 of the laser beam 6*a* for forming a depthless solidified part 4, and tracks 11 of laser beams 6*b* for forming deep solidified parts 5 were modified.

As shown in FIG. 9B, aluminum bus bars 2 were placed on nickel-plated copper terminals 1 in such a manner that any gaps 9 were not formed therebetween.

Then, the welding process was carried out in the laser radiation pattern shown in FIG. 9B in the same way as described above, except that the laser radiation pattern was modified such that one depthless solidified part 4 was formed at the outermost side, and deep solidified parts 5 and depthless solidified parts 4 were alternately formed (FIG. 9A).

In this example, tensile strengths were also measured, and samples exhibited 179 N, 184 N, and 199 N. Thus, all of the samples exhibited high joint strengths exceeding 100 N were realized.

Next, as shown in FIG. 9C, an aluminum bus bar 2 was placed on a nickel-plated copper terminal 1 in such a manner that a gap 9 of 0.1 mm is provided, and then, the prepared samples were subjected to the welding process in the above manner.

In this example, tensile strengths were also measured, and samples exhibited 194 N, 177 N, and 179 N. Thus, all of the samples exhibited high joint strengths exceeding 100 N were realized.

Thus, by forming depthless solidified parts, and deep solidified parts alternately located in weld structure, further reliable weld structures could be realized regardless of the presence of gaps 9, and, by adopting concentric laser-radiation patterns, highly reliable heterogeneous-material-based weld structures having high joint strength were obtained.

In addition, in this example, methods in which the laser radiation is started from the outermost circular track, and is moved inwardly along concentric circles are shown. However, the same effects can be obtained even when the radiation is started from any location.

Third Embodiment

The third embodiment differs from the first embodiment in that the laser output is not varied but the laser-moving speed is varied.

In FIG. 1A, the laser-operation speed over the track 7 is adjusted so as to be faster, while the laser-operation speed over the tracks 8 is adjusted so as to be slower.

Conditions other than those for the leaser operation are the same as those described for the first embodiment, and therefore, the third embodiment will be described based on the same drawings.

With regard to the depthless alloy-solidified part 4 shown in FIG. 1B, the temperature of the molten site forming the solidified part 4 is low since the speed for operation of the laser beam 6*a* is high, and therefore, the duration of exposure to heat is short.

For this reason, when the laser beam 6*a* is moved away from the molten site, the molten site is quickly solidified, and thus, the fusion time is short. Accordingly, intermetallic compounds are not produced therein.

As a result, ordinary alloys (having many lattice defects) are produced, and thus, misalignment of the lattices is easily caused by tensile stress.

Accordingly, a stable weld structure is produced so as to alleviate the tensile stress.

In contrast, with regard to the solidified parts 5, which are formed by the low-speed laser beams, the durations of exposure to the heat becomes longer as compared to the solidified part 4.

As a result, the temperatures of the molten sites forming the solidified parts 5 are higher, and therefore, it takes longer until the molten sites are solidified after the laser beams 6*b* are moved away from the molten sites.

As a result, intermetallic compounds having few lattice defects are produced therein.

In such intermetallic compounds, it is difficult for misalignment of lattices to occur due to tensile stress. Therefore, such stress cannot be alleviated by the intermetallic compounds.

For this reason, the solidified part 5 has characteristics that detachment of lattices would occur by lower tensile tension, and it has lower tensile strength, compared with the solidified part 4.

In cases where there is almost no gap 9 between the aluminum bus bar 2 and the nickel-plated copper terminal 1 as shown in FIG. 1B, high strength can be ensured by the presence of the solidified part 4.

Furthermore, in cases where a gap 9 is caused between the aluminum bus bar 2 and the nickel-plated copper terminal 1 due to production variations as shown FIG. 1C, the depthless solidified part 4 is almost not fused with the copper terminal 1, and thus, sufficient tensile strength due to the presence solidified part 4 would not be expected.

However, in such cases, the deep solidified parts 5 are fused with the copper terminal 1 over a wide area. Therefore, although each of the solidified parts 5 has low tensile strength, the solidified parts 5 can form a joint area having larger tensile strength as a whole.

As described above, at least one deep solidified part 5 that is formed by irradiation with a laser beam having larger energy, and at least one depthless solidified part 4 that is formed by irradiation with a laser beam having smaller energy are provided herein in the cross-section perpendicular to the welding direction.

Accordingly, either in cases where there are few gaps 9 between the aluminum bus bar 2 and the nickel-plated copper terminal 1, or in cases where a large gap 9 is caused therebetween, due to occurrence of production variations, a stable weld structure having higher joint strength can be produced based on inexpensive presser jigs.

Even the presence of one depthless solidified part 4 can ensure effects to maintain sufficient joint strength even in cases where there are few gaps 9 as mentioned above.

However, the presence of two or more depthless solidified parts 4 are preferable since stress will not focus on one location but will be dispersed.

In such cases, for the same reason as cases where the gap 9 is present, the presence of two or more deep solidified parts 5 is preferable.

Weld structures in which six deep solidified parts 5 are provided around the central area, and two depthless solidified parts 4 are present at both sides, which is an example of the above-mentioned preferable embodiment, are depicted in FIG. 2B (in which any gaps 9 are not present), and FIG. 2C (gaps 9 are present).

Furthermore, for the weld structures, the laser radiation pattern viewed from above is shown in FIG. 2A.

Additionally, although depthless solidified parts 4 are provided at the both sides in FIGS. 2B and 2C, no problems arise no matter where depthless solidified parts 4 are provided. Also, no problems arise when three or more depthless solidified parts 4 are provided.

Next, weld structures in which the same numbers of depthless solidified parts 4 and deep solidified parts are alternately formed are shown in FIG. 3B (in which any gaps 9 are not present), and FIG. 3C (gaps 9 are present).

Since tensile stress is evenly dispersed across the entire of the welded part, the stress will not focus on one location, and the welded part has improved resistance against breakage, and becomes stable. Therefore, the above-mentioned case is the most preferable.

EXAMPLE 8

EXAMPLE 8 differs from EXAMPLE 7 with regard to laser operation directions.

That is, the laser beams were moved as shown in FIG. 1A in this example.

Other matters are the same as those mentioned in EXAMPLE 7.

In order to form a depthless solidified part 4 from the surface of the aluminum bus bar 2, a laser beam 6a with an output of 1200 W was radiated and moved along a track 7 from a fiber laser at a speed of 800 mm/s over a distance of 10 mm.

Then, by displacing the radiation site from the track 7 to the horizontal direction by 0.1 mm, a laser beam 6b with 1200 W was radiated and moved along one of the tracks 8 at a speed of 500 mm/s in the same manner in order to form a deep solidified part 5.

The radiation was repeated 7 times by successively displacing the radiation site by 0.1 mm in the same manner.

In this example, three samples were prepared, and values of tensile strength (peeling strength) toward the upper direction in FIG. 1B were measured for these samples. As a result, their tensile strengths were 136 N, 182 N, and 144 N, and thus, all of the samples exhibited high tensile strengths exceeding 100 N were realized.

Next, as shown in FIG. 1C, an aluminum bus bar 2 was placed on a nickel-plated copper terminal 1 in such a manner that a gap 9 of 0.1 mm is provided, and then, the prepared samples were subjected to the welding process in the above manner.

Tensile strengths of produced samples were 133 N, 175 N, and 188 N. Thus, the samples exhibited high tensile strength exceeding 100 N although gaps 9 of 0.1 mm were present therein.

Moreover, the welding process was carried out by changing a laser-radiation pattern such that the depthless solidified part 4 was produced in the fourth location from the right side in FIG. 1B, with respect to samples in which there are no gaps 9, and samples in which there are gaps 9 of 0.1 mm. As a result, all of the samples exhibited high tensile strength exceeding 100 N in the same manner, regardless of the presence of gap 9.

Furthermore, the welding process was carried out by changing a laser-radiation pattern such that the depthless solidified part 4 was produced at the outermost left side in FIG. 1B, with respect to samples in which there are no gaps 9 and samples in which there are gaps 9 of 0.1 mm. As a result, all of the samples exhibited high tensile strength exceeding 100 N in the same manner, regardless of the presence of gap 9.

Thus, by forming at least one depthless solidified part 4, and multiple deep solidified parts 5, stable weld structures could be realized regardless of the presence or absence of gap 9.

Additionally, in this example, some examples of the plating thickness, and the thickness of the bus bar are shown. However, the disclosure is not limited to the values described in this example.

Moreover, conditions such as a laser output, welding speed, and laser scanning intervals depend on materials and surface states of metal members subjected to the welding process, thickness of the member, total thermal capacities including jigs, and therefore, are not limited to the above specifications.

Furthermore, although only three cases in which the depthless solidified parts are provided at the outermost right side, at the fourth location from the right side, and the outermost left side are described in this example, the same effects will be obtained no matter where the depthless solidified part is provided.

EXAMPLE 9

A welding process was carried out in the same manner as EXAMPLE 8 except that arrangements of the track 7 of the laser beam 6a for forming a depthless solidified part 4, and tracks 8 of laser beams 6b for forming deep solidified parts 5 were modified.

A laser radiation direction for EXAMPLE 9 is shown in FIG. 2A.

A cross-section view of the joint area is shown in FIG. 2B.

In this example, tensile strengths were also measured, and samples exhibited 166 N, 203 N, and 190 N. Thus, all of the samples exhibited high joint strengths exceeding 100 N were realized.

Next, as shown in FIG. 2C, an aluminum bus bar 2 was placed on nickel-plated copper terminal 1 in such a manner that a gap 9 of 0.1 mm is provided, and then, the prepared samples were subjected to the welding process in the above manner.

In this example, tensile strengths were also measured, and samples exhibited 154 N, 181 N, and 199 N. Thus, all of the samples exhibited high joint strengths exceeding 100 N were realized.

Next, welding processes were carried out in the same manner as described above except that the laser radiation pattern was modified such that depthless solidified parts 4 were formed at the outermost side, and at the fourth location from the outermost side in FIG. 2B. As a result, high tensile strengths between 150 N and 210 N were realized in either weld structures having no gaps 9 or weld structures having gaps of 0.1 mm.

Furthermore, welding processes were carried out in the same manner as described above except that the laser radiation pattern was modified such that depthless solidified parts 4 were formed at the fourth location from the right side, and at the outermost left side. As a result, high tensile strengths between 150 N and 210 N were realized in either weld structures having no gaps 9 or weld structures having gaps of 0.1 mm.

Thus, by forming two depthless solidified parts 4, and multiple deep solidified parts 5 in weld structures, reliable welding processes could be realized regardless of the presence of gaps 9.

Furthermore, although only three cases in which the depthless solidified parts are provided i) at the outermost right and left sides, ii) at the outermost right side and the fourth location from the right side, and iii) at the fourth location from the right side and the outermost left side are described in this example, the same effects will be obtained even when the depthless solidified parts are provided at any location.

EXAMPLE 10

Welding processes were carried out in the same manner as EXAMPLE 8 except that tracks 7 of laser beams 6a for forming depthless solidified parts 4, and tracks 8 of laser beams 6b for forming deep solidified parts 5.

A laser radiation direction for EXAMPLE 9 is shown in FIG. 3A. A cross-section view of the joint area is shown in FIG. 3B.

In this example, tensile strengths were also measured, and samples exhibited 178 N, 176 N, and 192 N. Thus, all of the samples exhibited high joint strengths exceeding 100 N were realized.

Next, as shown in FIG. 3C, an aluminum bus bar 2 was placed on a nickel-plated copper terminal 1 in such a manner that a gap 9 of 0.1 mm is provided, and then, the prepared samples were subjected to the welding process in the above manner.

In this example, tensile strengths were also measured, and samples exhibited 200 N, 173 N, and 177 N. Thus, all of the samples exhibited high joint strengths exceeding 100 N were realized.

Thus, by forming depthless solidified parts and deep solidified parts alternately, stable weld structures could be realized regardless of the presence or absence of gap 9.

In addition, although, in EXAMPLE 10, one depthless solidified parts 4 was formed at the outermost right side, and then, deep solidified parts 5 were successively formed, the same effects can be obtained even in cases in which one deep solidified part 5 is formed at first, and then, depthless solidified parts 4 are formed.

Fourth Embodiment

The fourth embodiment differs from the third embodiment with regard to the moving direction of laser beams.

Matters mentioned in this embodiment are the same as those described in the second embodiment.

Therefore, the fourth embodiment will be described with reference to the figures for the second embodiment.

EXAMPLE 11

Welding processes were carried out in the same manner as the second embodiment except that tracks of laser beams 6a for forming depthless solidified parts 4, and tracks of laser beams 6b for forming deep solidified parts 5.

As shown in FIG. 7B, aluminum bus bars 2 were placed on nickel-plated copper terminals 1 in such a manner that any gaps 9 are not formed therebetween. Then, the welding process was carried out such that depthless solidified parts 4 were formed at the outermost side, and deep solidified parts 5 were formed medial to the depthless solidified parts 4 (at the left sides in the figure). A laser radiation pattern for forming such a weld structure is shown in FIG. 7A.

A laser beam 6a with an output of 1200 W was radiated and moved along a circular track 10 with a diameter 5 mm from a fiber laser at a speed of 800 mm/s.

Then, A laser beam 6b having an output of 1200 W was moved along a concentric circular track 11 with a diameter of 4.8 mm at a speed of 500 mm/s in the same manner.

Laser beams were successively moved over the aluminum bus bars 2 in circular patters while the diameter of the circular track is reduced by 0.2 mm, and thus, the step of moving the laser beam in the circular pattern was repeated 7 times in total.

In this example, tensile strengths were also measured, and three samples prepared in the same manner exhibited 124 N, 150 N, and 169 N. Thus, all of the samples exhibited high joint strengths exceeding 100 N were realized.

Next, as shown in FIG. 7C, an aluminum bus bar 2 was placed on a nickel-plated copper terminal 1 in such a manner that a gap 9 of 0.1 mm is provided, and then, the prepared samples were subjected to the welding process in the above manner.

In this example, tensile strengths were also measured, and samples exhibited 133 N, 160 N, and 155 N. Thus, all of the samples exhibited high joint strengths exceeding 100 N were realized.

Thus, by forming at least one depthless solidified part, and multiple deep solidified parts, reliable weld structures could be realized regardless of the presence or absence of gap 9.

In addition, conditions such as laser outputs, welding speed, and scanning intervals shown in this example depend on materials and surface conditions of welding metal members, thicknesses of the plates, and total thermal capacity of members including jigs, and therefore, conditions for the welding process are not limited to those described above.

Furthermore, only cases in which one depthless solidified part 4 was provided at the outermost side are described in this example. However, no matter where the depthless solidified part 4 is located, the same effects can be obtained.

With regard to the order of radiation, the welding mechanism is the same in either cases where the welding process is started from the outer side or cases where the welding process is started from the inner side. Therefore, even when the radiation is carried out in any order, the same effects can be obtained.

EXAMPLE 12

Welding processes were carried out in the same manner as EXAMPLE 11 except that tracks 10 of laser beams 6a for forming depthless solidified parts 4, and tracks 11 of laser beams 6b for forming deep solidified parts 5.

Next, as shown in FIG. 8B, an aluminum bus bar 2 was placed on a nickel-plated copper terminal 1 in such a manner that any gaps 9 were not provided therebetween. Then, the welding process was carried out in the laser radiation pattern shown in FIG. 8A in the same way as described above, such that two depthless solidified parts 4 were formed at the outermost side and at the innermost side.

In this example, tensile strengths were also measured, and samples exhibited 177 N, 154 N, and 147 N. Thus, all of the samples exhibited high joint strengths exceeding 100 N were realized.

Next, as shown in FIG. 8C, an aluminum bus bar 2 was placed on a nickel-plated copper terminal 1 in such a manner that a gap 9 of 0.1 mm is provided, and then, the prepared samples were subjected to the welding process in the above manner.

In this example, tensile strengths were also measured, and samples exhibited 158 N, 163 N, and 139 N. Thus, all of the samples exhibited high joint strengths exceeding 100 N were realized.

Next, welding processes were carried out in the same manner as described above except that the laser radiation pattern was modified such that depthless solidified parts 4 were formed at the outermost side, and at the fourth location from the outermost side in FIG. 8B. As a result, high tensile strengths between 130 N and 180 N were realized in either weld structures having no gaps 9 or weld structures having gaps of 0.1 mm.

Furthermore, welding processes were carried out in the same manner as described above except that the laser radiation pattern was modified such that depthless solidified parts 4 were formed at the fourth location from the outermost side, and at the innermost side. As a result, high tensile strengths between 130 N and 180 N were realized in either weld structures having no gaps 9 or weld structures having gaps of 0.1 mm.

Thus, by forming two depthless solidified parts 4, and multiple deep solidified parts 5 in weld structures, reliable welding processes could be realized regardless of the presence of gaps 9.

Furthermore, although only three cases in which the depthless solidified parts 4 are provided i) at the outermost side and at the innermost side, ii) at the outermost side and the fourth location from the outermost location, and iii) at the fourth location from the outermost side and at the innermost side are described in this example, the same effects will be obtained even when the depthless solidified parts are provided at any location.

EXAMPLE 13

Welding processes were carried out in the same manner as EXAMPLE 12 except that tracks 10 of laser beams 6a for forming depthless solidified parts 4, and tracks 11 of laser beams 6b for forming deep solidified parts 5.

Next, as shown in FIG. 9B, an aluminum bus bar 2 was placed on a nickel-plated copper terminal 1 in such a manner that any gaps 9 were not provided therebetween.

Then, the prepared structures were subjected to a welding process so as to form weld structure in which one depthless solidified part 4 is formed at the outermost side, and deep solidified parts 5 and additional depthless solidified parts 4 were alternately located medial to the outermost depthless solidified part 4 as shown in FIG. 9A.

In this example, tensile strengths were also measured, and samples exhibited 203 N, 190 N, and 199 N. Thus, all of the samples exhibited high joint strengths exceeding 100 N were realized.

Next, as shown in FIG. 9C, an aluminum bus bar 2 was placed on a nickel-plated copper terminal 1 in such a manner that a gap 9 of 0.1 mm is provided, and then, the prepared samples were subjected to the welding process in the above manner.

In this example, tensile strengths were also measured, and samples exhibited 184 N, 198 N, and 188 N. Thus, all of the samples exhibited high joint strengths exceeding 100 N were realized.

Thus, by forming depthless solidified parts, and deep solidified parts alternately located in weld structure, further reliable weld structures could be realized regardless of the presence of gaps 9, and, by adopting concentric laser-radiation patterns, highly reliable heterogeneous-material-based weld structures having high joint strength were obtained.

In addition, in this example, methods in which the laser radiation is started from the outermost circular track, and is moved inwardly along concentric circles are shown. However, the same effects can be obtained even when the radiation is started from any location.

Fifth Embodiment

Figure 10A:
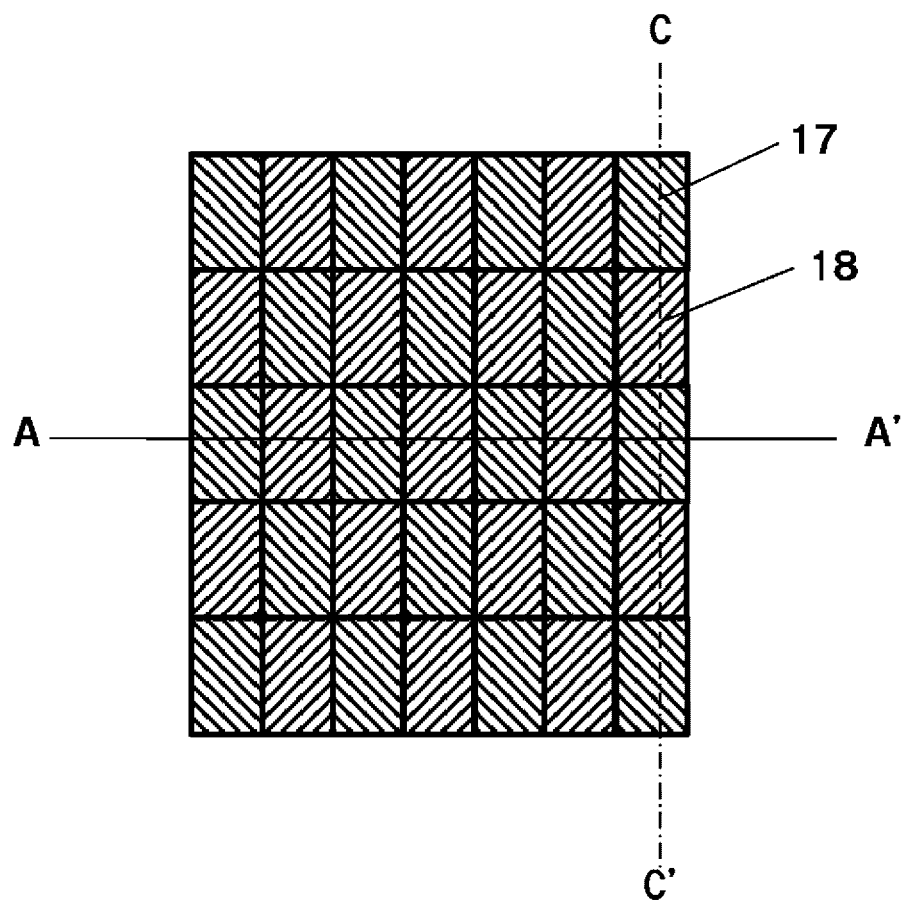
FIG. 10A is a top view that shows a laser-radiation pattern in a fifth embodiment.

A laser radiation pattern for the fifth embodiment is shown in the plan view of FIG. 10A.

Figure 10B:
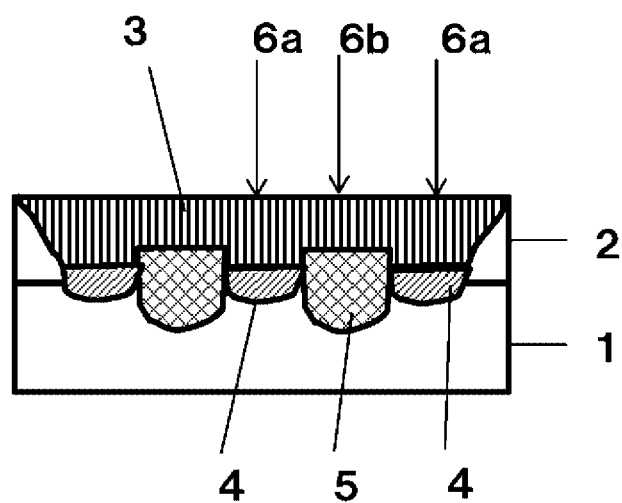
FIG. 10B is a cross-section view in a direction parallel to the laser-moving direction, showing a weld structure according to the fifth embodiment in a case where there are no spaces.
Figure 10C:
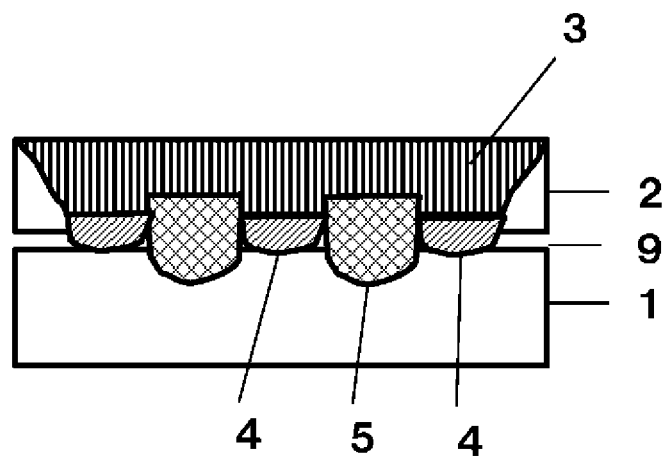
FIG. 10C is a cross-section view in a direction parallel to the laser-moving direction, showing a weld structure according to the fifth embodiment in a case where there is a space.

FIGS. 10B and 10C are cross-section views of weld structures along the line C-C' parallel to the laser moving direction in FIG. 10A.

In the first to fourth embodiments, cross-sections of the weld structures that are perpendicular to the moving directions of the laser beams are described. However, for the fifth embodiment, cross-sections of weld structures that are parallel to moving directions of laser beams will be described.

In FIG. 10A, sections 17 in which laser beams having lower outputs are radiated, and sections 18 in which laser beams having higher outputs are radiated are alternately repeated. Thus, FIG. 10A shows a laser-radiation pattern in which higher-output laser sections 17 and lower-output laser sections 18 are alternately repeated.

As shown in FIG. 10B, in the cross-section in the laser-operation direction, lower-output laser beams 6a are radiated to the multiple sections, and thus, depthless solidified parts 4 are formed therein.

Then, higher-output laser beams 6b are radiated to multiple sections, and thus, deep solidified parts 5 are formed therein.

By repeating these steps, a weld structure in which depthless solidified parts 4 and deep solidified part 5 are alternately formed in the cross-section in the moving direction of the laser beams is produced.

Subsequently, the laser-operation sites are displaced, laser beams 6b having higher power are radiated to multiple sections, and then, laser beams 6a having lower power are radiated to multiple sections.

By repeating these steps, a weld structure in which deep solidified part 5 and depthless solidified parts 4 are alternately formed in the cross-section in the moving direction of the laser beams is produced.

By repeating this laser radiation patter, depthless solidified parts 4 and deep solidified parts 5 are alternately formed in the weld structure as shown in FIG. 10B.

Furthermore, depthless solidified parts 4 and deep solidified parts 5 are alternately formed in the cross-section along the line A-A' perpendicular to the laser moving direction, as shown in FIG. 10B.

When the above structure is formed, a joint area between the nickel-plated copper terminal 1 and the aluminum bus bar 2 becomes larger, and the joint area is formed in a concavo-convex shape. Accordingly, anchoring effects will be secured, and thus, improved and reliable joint strength can be secured against tensile stress coming from every direction.

Figure 11:
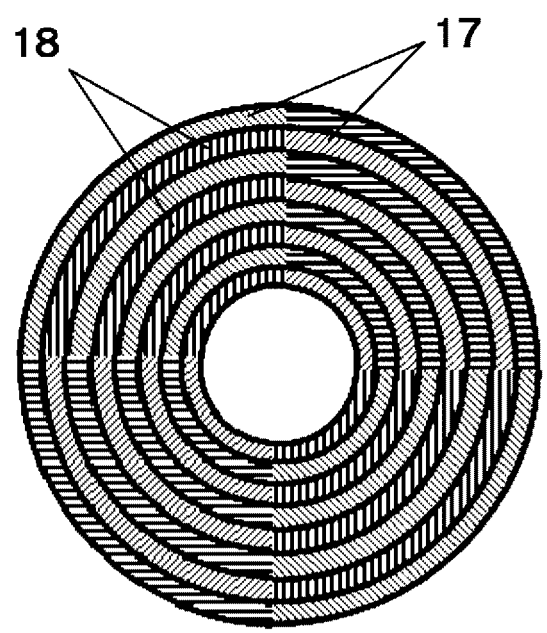
FIG. 11 is a diagram that schematically shows a laser-radiation pattern in the fifth embodiment when viewed from a side where an aluminum bus bar is present.
Figure 12A:
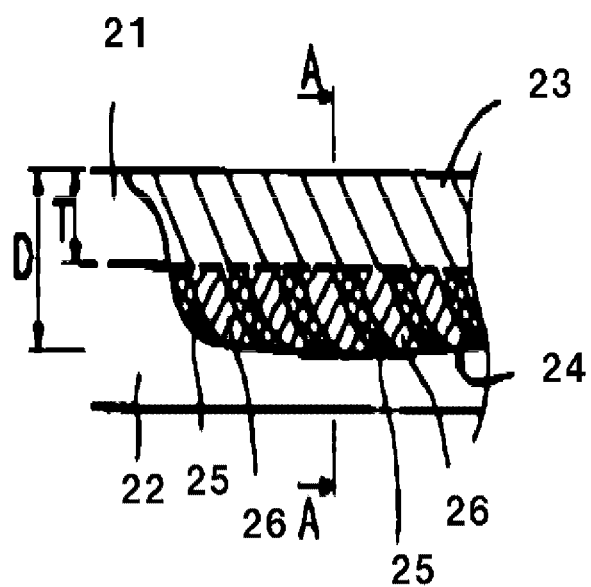
FIG. 12A is a cross-section view of a conventional weld structure in a direction perpendicular to the laser-moving direction.
Figure 12B:
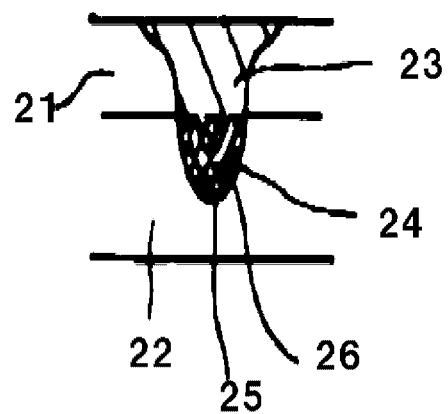
FIG. 12B is a cross-section view of the weld structure along the line A-A in FIG. 12A.

Moreover, when the welding configuration as shown in FIG. 11 (viewed from above) is adopted, tensile stress can further evenly be distributed over the weld structure, and more highly reliable joint strength can be secured.

Furthermore, even when gaps 9 are present in the weld structures as shown in FIG. 10C, more highly reliable joint strength can be secured.

Thus, by forming depthless solidified parts, and deep solidified parts alternately and two-dimensionally, weld structures securing more highly reliable joint strength can be realized regardless of the presence of gap 9.

In the above embodiments/examples, only combinations of aluminum and copper are shown. However, the disclosure is applicable to any combinations of metals that produce intermetallic compounds.

For example, combinations such as Ti and Al, Ni and Al, and Fe and Ti can be mentioned, and thus, the disclosure can be applied to these combinations.

In the above-described examples, a fiber laser was employed as a laser emission device. However, the same effects can be obtained by using other types of laser devices such as disk lasers, YAG lasers, $CO_2$ lasers, and semiconductor lasers that produce high-output laser beams.

The disclosure makes it possible to realize high-quality and cost-effective welding of heterogeneous materials such as aluminum and nickel-plated copper.

Accordingly, the disclosure makes it possible to provide battery systems at lower costs.

Furthermore, the disclosure can be applied to production of in-vehicle batteries and stationary power storage systems that all require higher outputs.

What is claimed is:

1. A weld structure, comprising:
a first metal member; and
a second metal member, wherein the first metal member is located over the second metal member, wherein
at least one first solidified part that extends from a surface of the first metal member to the inside of the first metal member, at least one second solidified part that is formed by a molten area extending through the first metal member and the second metal member, and at least one third solidified part that is formed by another molten area extending through the first metal member and the second metal member are provided,
the third solidified part is located closer to a non-layered surface of the second metal member than the second solidified part is,
the at least one second solidified part and the at least one third solidified part are each located in different linear areas,
the first solidified part and the second solidified part are different types of metals, the first solidified part is an alloy of the first metal member, and the second solidified part is an alloy of the first metal member and the second metal member,
the third solidified part is an intermetallic compound,
the at least one third solidified part includes multiple third solidified parts, and the multiple third solidified parts are adjacent to each other and in contact with each other.

2. The weld structure according to claim 1, wherein the at least one second solidified part includes multiple second solidified parts, and two or more sets of the multiple third solidified parts and the multiple second solidified parts are alternately and continuously arranged.

3. The weld structure according to claim 1, wherein a length of the at least one third solidified part in a layered-surface direction is equal to or higher than 1.5 times a length of the at least one second solidified part in the layered-surface direction.

4. The weld structure according to claim 1, wherein the at least one second solidified part and the at least one third solidified part are formed through a welding process, and two or more sets of the at least one second solidified part and the at least one third solidified part are alternately formed in a cross-section of the weld structure perpendicular to a welding direction in the welding process.

5. The weld structure according to claim 1, wherein the first metal member is made of aluminum, and the second metal member is made of copper.

6. The weld structure according to claim 1, wherein the at least one second solidified part and the at least one third solidified part are linear.

7. The weld structure according to claim 1, wherein the first metal member is made of Ti, and the second metal member is made of Al.

8. The weld structure according to claim 1, wherein the first metal member is made of Ni, and the second metal member is made of Al.

9. The weld structure according to claim 1, wherein the first metal member is made of Fe, and the second metal member is made of Ti.

10. The weld structure according to claim 2, wherein the second solidified part is located at an end of the multiple third solidified parts.

11. The weld structure according to claim 10, wherein the second solidified part is located at both ends of the multiple third solidified parts.

12. The weld structure according to claim 1, wherein the second solidified part and the third solidified part are each ring-shaped.

* * * * *